US010705591B2

(12) United States Patent
Srinivasan et al.

(10) Patent No.: US 10,705,591 B2
(45) Date of Patent: Jul. 7, 2020

(54) AGGREGATED ELECTRONIC DEVICE POWER MANAGEMENT

(71) Applicant: Microsoft Technology Licensing, LLC, Redmond, WA (US)

(72) Inventors: Harish Srinivasan, Sammamish, WA (US); Robert C. Combs, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 166 days.

(21) Appl. No.: 15/441,778

(22) Filed: Feb. 24, 2017

(65) Prior Publication Data

US 2018/0120917 A1     May 3, 2018

Related U.S. Application Data

(60) Provisional application No. 62/415,228, filed on Oct. 31, 2016, provisional application No. 62/415,183,
(Continued)

(51) Int. Cl.
*G06F 1/32* (2019.01)
*G06F 1/3287* (2019.01)
(Continued)

(52) U.S. Cl.
CPC ............ *G06F 1/3287* (2013.01); *G06F 1/266* (2013.01); *G06F 1/3203* (2013.01);
(Continued)

(58) Field of Classification Search
None
See application file for complete search history.

(56) References Cited

U.S. PATENT DOCUMENTS 5,825,674 A   10/1998   Jackson
6,065,123 A    5/2000   Chou et al.
(Continued)

FOREIGN PATENT DOCUMENTS

TW      200950409 A    12/2009
WO     2013085539 A1    6/2013
WO     2015099700 A1    7/2015

OTHER PUBLICATIONS

International Search Report and Written Opinion Issued in PCT Application No. PCT/US2017/057940, dated Jan. 24, 2018, 12 Pages.
(Continued)

*Primary Examiner* — Fahmida Rahman
(74) *Attorney, Agent, or Firm* — Holzer Patel Drennan

(57) ABSTRACT

A system for aggregated electronic device power management includes an aggregated power management arbitrator configured to collect activity information from one or more electronic devices regarding the use of a type of hardware component on the electronic devices. The aggregated power management arbitrator selects a timeout period for transmitting to one of the one or more electronic devices to define a minimum amount of time before the hardware component is transitioned to a lower-power state. The aggregated power management arbitrator may determine usage patterns for one of the electronic devices based on the collected activity information and the applications executing on the electronic device. A timeout period may be adjusted based on the determined usage pattern to improve efficiency of the power management of the electronic device.

23 Claims, 10 Drawing Sheets

Related U.S. Application Data filed on Oct. 31, 2016, provisional application No. 62/415,142, filed on Oct. 31, 2016.

(51) Int. Cl.

| | |
|---|---|
| *G06F 1/3203* | (2019.01) |
| *G06F 1/3296* | (2019.01) |
| *G06F 1/3228* | (2019.01) |
| *G06F 1/3234* | (2019.01) |
| *G06F 11/34* | (2006.01) |
| *G06F 1/26* | (2006.01) |
| *G06F 1/3209* | (2019.01) |
| *G06F 11/30* | (2006.01) |

(52) U.S. Cl.
CPC .......... *G06F 1/3209* (2013.01); *G06F 1/3228* (2013.01); *G06F 1/3234* (2013.01); *G06F 1/3278* (2013.01); *G06F 1/3296* (2013.01); *G06F 11/3048* (2013.01); *G06F 11/3051* (2013.01); *G06F 11/3409* (2013.01); *G06F 11/3423* (2013.01); *Y02D 10/157* (2018.01); *Y02D 10/171* (2018.01); *Y02D 10/172* (2018.01); *Y02D 50/20* (2018.01)

(56) References Cited

U.S. PATENT DOCUMENTS

| | | | |
|---|---|---|---|
| 6,105,142 A | 8/2000 | Goff et al. | |
| 6,654,895 B1 | 11/2003 | Henkhaus et al. | |
| 7,562,234 B2 | 7/2009 | Conroy et al. | |
| 8,140,868 B2 | 3/2012 | Felter et al. | |
| 8,627,125 B2 * | 1/2014 | Kashyap | G06F 1/3206 345/212 |
| 8,650,416 B2 | 2/2014 | Noel | |
| 8,738,950 B2 | 5/2014 | Cooper et al. | |
| 8,839,006 B2 | 9/2014 | Li et al. | |
| 8,892,710 B2 | 11/2014 | Gatta et al. | |
| 9,442,554 B1 | 9/2016 | Arscott et al. | |
| 2003/0210658 A1 | 11/2003 | Hernandez et al. | |
| 2004/0003300 A1 | 1/2004 | Malueg et al. | |
| 2004/0153263 A1* | 8/2004 | Holle | G06F 1/3228 702/60 |
| 2004/0153676 A1 | 8/2004 | Krantz et al. | |
| 2005/0190714 A1 | 9/2005 | Gorbatov et al. | |
| 2007/0223028 A1* | 9/2007 | Boyes, Jr. | G03G 15/5004 358/1.14 |
| 2008/0005381 A1 | 1/2008 | Theocharous et al. | |
| 2008/0101230 A1 | 5/2008 | Liu et al. | |
| 2008/0307243 A1 | 12/2008 | Lee | |
| 2009/0052372 A1 | 2/2009 | Durazzo et al. | |
| 2009/0063878 A1 | 3/2009 | Schmidt et al. | |
| 2009/0287948 A1 | 11/2009 | Chary | |
| 2010/0077234 A1 | 3/2010 | Das | |
| 2010/0100755 A1 | 4/2010 | Lin et al. | |
| 2010/0162013 A1 | 6/2010 | Oh et al. | |
| 2010/0169684 A1* | 7/2010 | Jeyaseelan | G06F 1/3203 713/323 |
| 2011/0039508 A1 | 2/2011 | Lindahl et al. | |
| 2011/0055399 A1* | 3/2011 | Tung | G06F 9/5072 709/226 |
| 2011/0069649 A1 | 3/2011 | Gobriel et al. | |
| 2011/0078475 A1 | 3/2011 | Juenemann et al. | |
| 2011/0176463 A1 | 7/2011 | Cowan et al. | |
| 2011/0185200 A1 | 7/2011 | Sim et al. | |
| 2011/0252252 A1 | 10/2011 | Ramakrishnan et al. | |
| 2012/0076011 A1 | 3/2012 | Gobriel et al. | |
| 2012/0123984 A1* | 5/2012 | Nagpal | G06F 17/3041 706/21 |
| 2012/0137217 A1 | 5/2012 | Amsterdam et al. | |
| 2012/0311361 A1 | 12/2012 | Locker et al. | |
| 2013/0283073 A1 | 10/2013 | Jeganathan et al. | |
| 2014/0064134 A1 | 3/2014 | Huang et al. | |
| 2014/0105084 A1 | 4/2014 | Chhabra et al. | |
| 2014/0136869 A1 | 5/2014 | Sadowski et al. | |
| 2014/0157026 A1 | 6/2014 | So et al. | |
| 2014/0173298 A1 | 6/2014 | Bircher et al. | |
| 2014/0181552 A1* | 6/2014 | Andreoli | G06F 1/3228 713/323 |
| 2014/0211676 A1* | 7/2014 | Chhabra | H04W 76/38 370/311 |
| 2015/0031326 A1 | 1/2015 | Begin et al. | |
| 2015/0098374 A1 | 4/2015 | Homchaudhuri et al. | |
| 2015/0121106 A1 | 4/2015 | Eckert et al. | |
| 2015/0286820 A1 | 10/2015 | Sridhara et al. | |
| 2016/0070332 A1* | 3/2016 | Viswanadham | G06F 1/3234 713/320 |
| 2016/0246341 A1 | 8/2016 | Burrell et al. | |
| 2018/0356871 A1* | 12/2018 | Gutierrez-Vazquez | G06F 1/3231 |

OTHER PUBLICATIONS

"International Search Report and Written Opinion Issued in PCT Application No. PCT/US2017/057941", dated Feb. 1, 2018,11 Pages.

International Search Report and Written Opinion Issued in PCT Application No. PCT/US2017/057942, dated Feb. 1, 2018, 11 Pages.

Chatterjee, et al., "Exploring Adaptive Power Saving Schemes for Mobile VoIP Devices in IEEE 802.11 Networks", In Proceedings of Second International Conference on Digital Telecommunications, Jul. 1, 2007, 7 pages.

Khan, et al., "Online learning of timeout policies for dynamic power management", In ACM Transactions on Embedded Computing Systems, vol. 13, Issue 4, Feb. 2014, 25 pages.

Information About Power Management Setting on a Network Adapter, https://support.microsoft.com/en-us/kb/2740020, Published on: Sep. 25, 2015, 5 pages.

"Non Final Office Action Issued in U.S. Appl. No. 15/441,865", dated Jun. 27, 2018, 29 Pages.

"Non Final Office Action Issued in U.S. Appl. No. 15/441,693", dated Jul. 12, 2018, 12 Pages.

"Notice of Allowance Issued in U.S. Appl. No. 15/441,693", dated Jan. 10, 2019, 10 Pages.

"Final Office Action Issued in U.S. Appl. No. 15/441,865", dated Jan. 29, 2019, 29 Pages.

"Non-Final Office Action Issued in U.S. Appl. No. 15/441,865", dated Jun. 26, 2019, 31 Pages.

"Final Office Action Issued in U.S. Appl. No. 15/441,865", dated Jan. 14, 2020, 33 pages.

"Advisory Action Issued in U.S. Appl. No. 15/441,865", dated Mar. 27, 2020, 5 pages.

\* cited by examiner

AGGREGATED ELECTRONIC DEVICE POWER MANAGEMENT

CROSS-REFERENCE TO RELATED APPLICATIONS

The present application claims benefit of priority to U.S. Provisional Patent Application No. 62/415,142, entitled "USAGE PATTERN INFLUENCE ON POWER MANAGEMENT" and filed on Oct. 31, 2016, U.S. Provisional Patent Application No. 62/415,183, entitled "DEVICE-AGGREGATING ADAPTIVE POWER MANAGEMENT" and filed on Oct. 31, 2016, and U.S. Provisional Patent Application No. 62/415,228, entitled "SUPERVISORY CONTROL OF POWER MANAGEMENT" and filed on Oct. 31, 2016, which are specifically incorporated by reference for all that they disclose and teach.

The present application is also related to U.S. patent application Ser. No. 15/441,693, entitled "USAGE PATTERN BASED SUPERVISORY CONTROL OF POWER MANAGEMENT," and U.S. patent application Ser. No. 15/441,865, entitled "SUPERVISORY CONTROL OF POWER MANAGEMENT," both of which are filed concurrently herewith and are specifically incorporated by reference for all that they disclose and teach.

BACKGROUND

Power consumption management of the various system hardware components in a computing device, such as network adapters, display interfaces, input/output devices, cameras, etc., becomes more challenging as more computing devices become mobile and depend on battery power as a primary power source. Various modules in an operating system (OS) contribute to the management of power, such as deciding when a component may transition to a low-power mode. Applications and OS modules, however, can block system hardware components from going to low-power. For example, some computing systems rely on applications to register their use of a system device when the device is needed by the application and release the device when the application no longer needs to use the device. This arrangement can block the hardware component from going to low-power mode, even for a brief period, when the device is not in use because applications often do not reliably register and release their requests to use the hardware component. Often the device could have transitioned to a lower-power state, thus drawing less power from the battery than if the device had not transitioned to a low-power state.

SUMMARY

The described technology provides an aggregated power management arbitrator for remote power management of a plurality of electronic devices. The aggregated power management arbitrator collects activity information regarding the use of a type of hardware component on each of the plurality of remote electronic devices by one or more applications executing on each of the remote electronic devices. The aggregated power management arbitrator then sets a timeout period associated with the use of the type of hardware component based on the collected activity information and transmits the timeout period to one of the plurality of remote electronic devices. The aggregated power management arbitrator's collection of activity information from a pool of available remote electronic devices permits aggregate data analysis and the identification of individual remote electronic devices that are not employing efficient power management, such as not transitioning the type of hardware component to a lower-power state as frequently as other remote electronic devices. The aggregated power management arbitrator may send shortened timeout periods to any inefficiently operating remote electronic devices to improve power management thereon in comparison to other remote electronic devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTIONS

Figure 1:
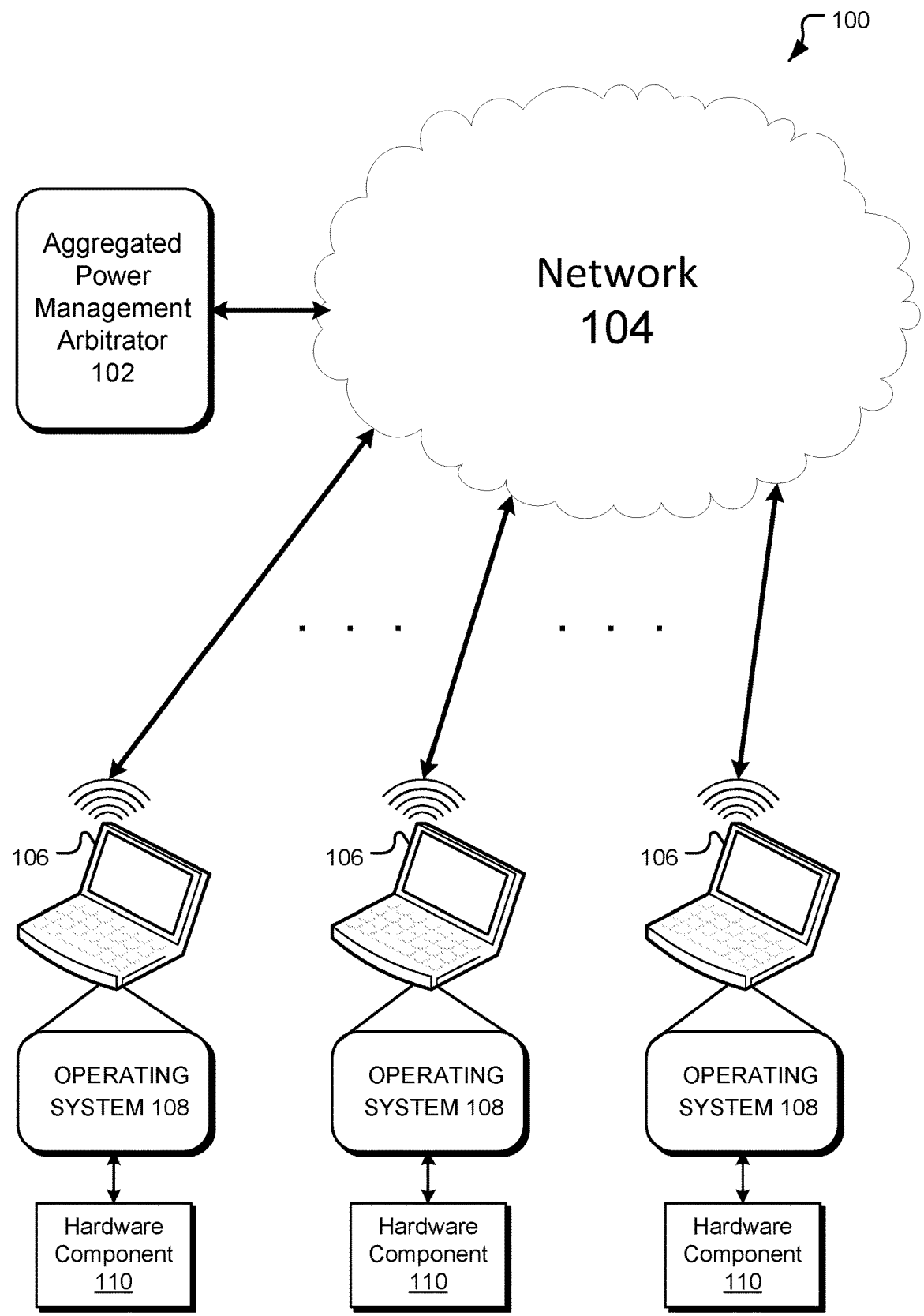
FIG. 1 illustrates an example environment for aggregated power management on a plurality of remote electronic devices.

Under a system of aggregated power management, an aggregated power management arbitrator collects information from electronic devices, determines power management parameters based on the collected information, and supplies the power management parameters (e.g., timeout periods, wakeup periods, power state transition targets, power consumption targets, etc.) to the electronic devices. The electronic devices utilize the power management parameters according to a system of supervisory control of power management, which allows a system hardware component of the electronic device (e.g., a network adapter, video adapter, input/output device, etc.) to transition to a low-power mode (or lower-power mode) after all applications have relinquished use of the system hardware component for the duration of a timeout period (e.g., transmitting or receiving network communications, displaying video, audio output, etc.) even if some applications are still registered to use the hardware component.

The power management parameters determined by the aggregated power management arbitrator include timeout periods and wakeup periods associated with types of system hardware components on the electronic devices. When the power management parameters are received by the electronic devices, a system of supervisory control on the electronic devices enforces the timeout and wakeup periods for the associated system hardware components. By comparing activity information across electronic devices, the aggregated power management arbitrator may be able to identify electronic devices that are not employing efficient power management practices. For electronic devices that are not employing efficient power management practices, the aggregated power management arbitrator may adjust timeout and/or wakeup periods for a type of hardware component to increase power management efficiency and transmit the adjusted timeout and/or wakeup periods to the electronic device for use by the supervisory power management systems located thereon.

This disclosure describes a system and methods for effective aggregate power management for electronic devices having a type of hardware component, including networking components and controlling the power state of network adapters. A result of the described technology is a refinement in power consumption by automating the reduction of system hardware component power consumption states during those periods when the system hardware component is not needed (e.g., transitioning a network adapter to a low-power or lower-power state when network traffic is not actually flowing), even if only for a very brief period of time without relying on applications executing on the device to release their use of the hardware component by notifying the operation system.

Various examples are described below with respect to the figures. These examples are merely exemplary, and implementations of the present disclosure are not limited to the examples described below and illustrated in the figures.

FIG. 1 illustrates an example environment 100 for aggregated power management of a plurality of remote electronic devices 106. The plurality of electronic devices 106 are electronic devices with an OS 108 and one or more system hardware components 110. The system hardware components 110 are capable of transitioning between one or more high-power modes and lower-power modes. In at least some implementations, the one or more system hardware components 110 of the plurality of electronic devices 106 are capable of multiple power modes or states, including intermediate power modes between a higher-power mode and a lower-power mode. For example, a system hardware component 110 may have one or more on-board processors for that may be turned off in a low-power mode, limited to a speed below full capacity in an intermediate power mode, and allowed to run at full speed in a high-power mode. As used herein, "power mode" and "power state" refer to the energy consumption of a system hardware component relative to the maximum amount of power the system hardware component is capable of consuming. Power states may be referred to as "higher-power" and/or "lower-power" states to indicate that a power state is higher or lower than another power state without necessarily implying that the power state is the highest or lowest power state that the system hardware component is capable of. Other implementations may include additional power modes to provide a finer control over aggregated power management of the plurality of electronic devices 106.

In an implementation, the plurality of electronic devices 106 each include a power management supervisory controller and a power management arbitrator as part of the OS 108. As used herein, an electronic device including these components said to be under supervisory control of power management. The power management supervisory controller may instruct the power management arbitrator to enforce a timeout period for a system hardware component that is part of the electronic device 106. The power management supervisory controller may receive the timeout period for a particular system hardware component that is part of the electronic device 106 from a remote aggregated power management arbitrator. In an implementation, the power management supervisory controller is associated with a higher level of the OS on the device 106, and the power management arbitrator is associated with a lower level of the OS on the device 106. The power management arbitrator may transition system hardware components between various power modes by controlling a hardware sublayer, a hardware driver, and/or a component of the data link layer of the OS associated with the hardware system device. In an implementation, the power management arbitrator need not communicate with the power management supervisory controller or other components of the OS on electronic device 106 to effect power state transitions of system hardware components.

The OS 108 of device 106 manages the applications in the system that utilize system services, including, for example, network services, video display, audio output, etc. Network adapters will be a focus of the description herein, but the aggregate power management and supervisory power management features described may apply to any other system hardware components as well. Hence, the OS 108 is aware whether the network will be needed by monitoring applications and OS modules that depend on the network adapter. This management represents a supervisory state that the OS of device 106 can apply to individual network adapters, based on the need for each rather than relying on registration of application for the network adapters. As applications begin and end execution, the OS 108 tracks the hardware component's overall network need, which network devices (or media) are needed, and the load status of the network devices. The OS of device 106 informs a component such as a low-level OS arbitrator, an NDIS API, and/or a miniport driver whether the network is needed by the applications. If the network is not needed, the network adapter is transitioned to low-power.

When the OS 108 executing on device 106 indicates that the network is needed by applications or services, the OS 108 still does not know the actual network demand. The system applications and operating modules calling for network usage, therefore, benefit from a separation of higher-level components of the OS of device 106 from the low-level OS components such as the network adapter, arbitrator, etc. Accordingly, network adapter power management can be controlled at the lowest possible layer in the network stack. If the upper-level OS indicates that network services are not needed, the network adapter can be transitioned to low-power. However, when the OS 108 indicates that applications or services do require the network, it is still possible, or even likely, that there are periods where the network is not actually needed because applications often register with the OS for control of a system hardware component even if it is not needed for periods of time by the application. During these periods of network inactivity, the network adapter can be transitioned to low-power. Usually, these periods of inactivity are quite short, often several such periods per second. The sum of these inactive periods is typically larger than the periods of actual network use. Transitioning to low-power for these periods saves a significant portion of power the network adapter would otherwise be using.

The aggregated power management arbitrator 102 is in communication with the electronic devices 106 via a network 104. Among other functions, the aggregated power management arbitrator 102 collects activity information from the electronic devices 106 regarding their use of a type of system hardware component such as hardware component 110. The activity information collected from the electronic devices 106 by the aggregated power management arbitrator 102 may include different types of information describing the state and usage history of the system hardware component 110. For example without limitation, the collected activity information may include a length of time that the hardware component 110 has spent in a higher- or lower-power state over a period of time, the number of transitions the hardware component has made between power states, the number of transitions the hardware components has made from a higher-power state to a lower-power state over a period of time, which power states the hardware component 110 was in over a period of time, the total amount of power consumed by the hardware component 110 over a period of time, etc. The aggregated power management arbitrator 102 may also collect other information regarding the electronic devices 106 including without limitation hardware and/or software versions and revisions, hardware versions of hardware components 110, the identity of applications executing on OS 108, the length of time certain applications executed on OS 108, the amount of processing cycles used by certain applications executed on OS 108, etc.

Based on the collected activity information regarding the use of the hardware components 110 by the electronic devices 106, the aggregated power management arbitrator 102 may select timeout periods for a hardware component 110 on an electronic device 106. The aggregated power management arbitrator 102 may be controlled by any entity that has an interest in improving the energy efficiency and thus the user experience on the electronic devices 106 for example without limitation the publisher of OS 108, the OEM manufacturer of the electronic device 106, the manufacturer of the hardware component 110, the publisher of an application executing on OS 108, etc. The operator of the aggregated power management arbitrator 102 may set targets for the amount of power consumed by the hardware component 110 under various operating conditions, for example, when executing a set of applications or using an application in a certain way (e.g., a music streaming application that requests network traffic on a network adapter to download the next song in a playlist after the prior song begins playing with network idle spaces in between, a video game application wherein the user is away from the keyboard and thus it is acceptable for the video adapter to refresh the frame buffer at a rate lower than 60 frames per second, etc.). The aggregated power management arbitrator 102 may then send the selected timeout periods for the hardware component 110 to the electronic device 106.

In other implementations, the power management supervisory controller on an electronic device 106 may set a timeout period without receiving the timeout period first from the aggregated power management arbitrator 102. In yet other implementations, the power management supervisory controller on an electronic device 106 may select from one or more timeout periods for a system hardware component on the electronic device 106 received from the aggregated power management arbitrator 102 based on a criteria including, without limitation, current battery status, requests from applications executing on OS 108 to use the system hardware component 110, etc.

Figure 2:
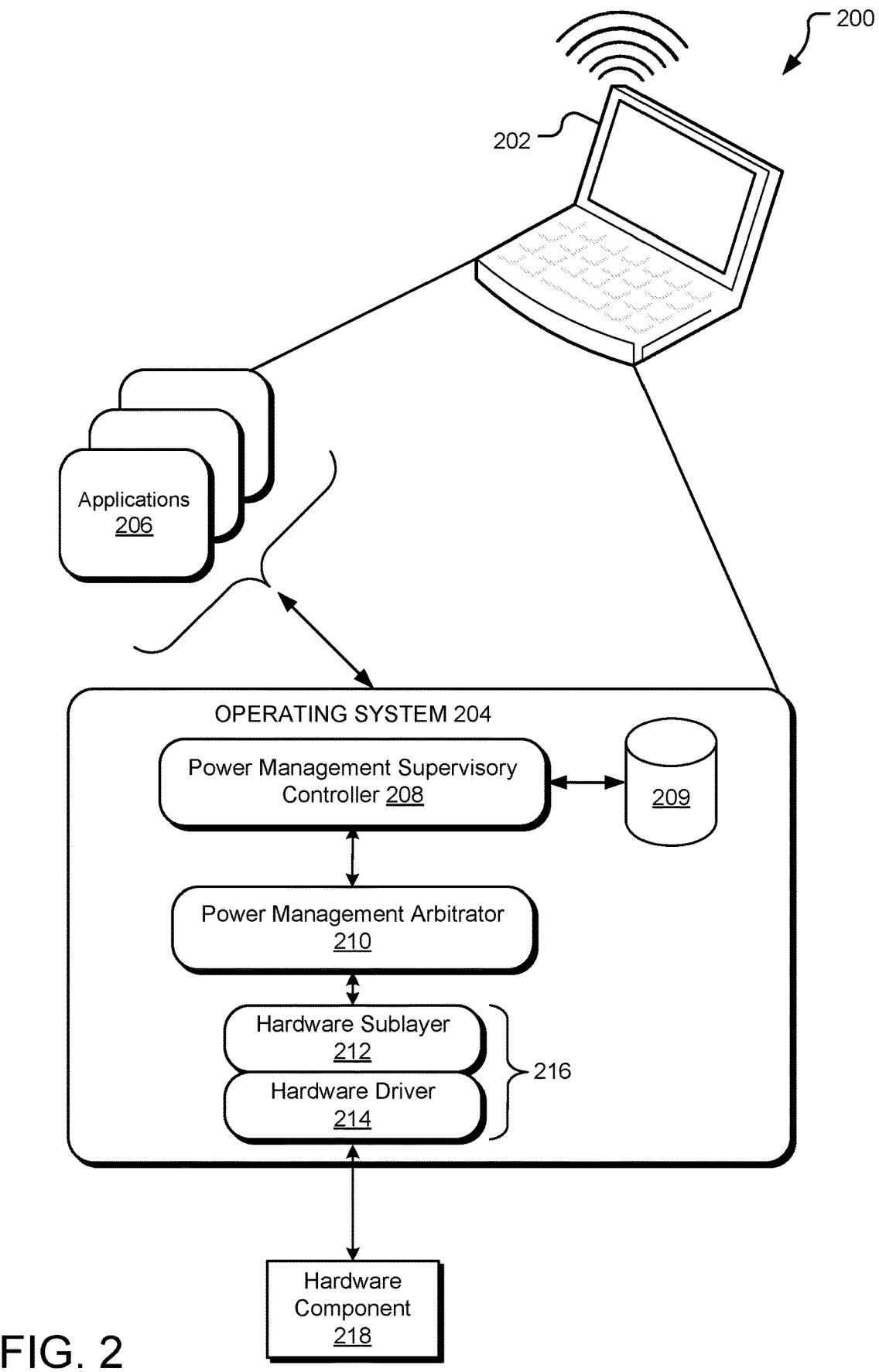
FIG. 2 illustrates an example environment for aggregated power management with supervisory power management control on a client device.

FIG. 2 illustrates an example environment 200 for aggregated power management with supervisory power management control on a client device 202. The device 202 includes an OS 204 and a variety of applications 206 executing thereon. The applications 206 may include components of the OS as well as other executable applications. Some of the applications 206 seek to use resources provided by a hardware component 218 that is part of the device 202. Requests from the applications 206 to use hardware component 218 are managed by a power management supervisory controller 208. In an implementation, the power management supervisory controller is a part of the OS. If there are no pending requests to use hardware component 218 from the applications 206, then the power management supervisory controller 208 can direct the hardware component 218 to transition to a low-power state. A command to transition the hardware component 218 may be communicated from the power management supervisory controller 208 to the hardware component via one or more intermediate levels. In an implementation, the intermediate levels include a power management arbitrator 210, a hardware sublayer 212, and a hardware driver 214. The hardware sublayer and hardware driver may be referred to herein as the hardware interface controller 216, which may include a combination of hardware and software components.

If there are pending requests from the applications 206 to use the hardware component 218, then the power management supervisory controller may not be aware of the true demand for the hardware component 218 because applications 206 may register with the power management supervisory controller 208 to use the hardware component 218 without necessarily using the hardware component 218 or may only use the hardware component sporadically or with a usage pattern that leaves the hardware component 218 idle for periods of time. Accordingly, the power management supervisory controller 208 may delegate power management decisions to a lower level of the OS (e.g., the power management arbitrator 210). The power management arbitrator 210 monitors the load on the hardware component 218 and the applications 206 that are using the hardware component 218. The power management arbitrator 210 may independently transition the hardware component 218 to a low-power state (or an intermediate lower-power state) for periods of time during which the hardware component 218 would not have been transitioned to a low-power state if the transitioning decision had been based on registrations of applications 206 to use the hardware component 218.

In at least one implementation, the power management supervisory controller is in communication with a data store 209. The data store 209 contains a variety of information regarding timeout periods that are available for use by the power management supervisory controller 208, which may be implemented by the power management supervisory controller 208 directly or delegated to the power management arbitrator 210 or other lower levels of the OS 204. The data store 209 may include tables of timeout periods with timeout periods associated with particular applications 206. Timeout periods in the data store 209 may be received from an aggregated power management arbitrator. In one implementation, the power management supervisory controller 208 selects a timeout period from a plurality of timeout periods in data store 209 to pass to the power management arbitrator 210. For example, the power management supervisory controller 208 may select the longest timeout period from a set of timeout periods corresponding to the applications 206 running on OS 204 as the timeout period the power management arbitrator 210 should use for a hardware component 218. In at least one implementation, the power management supervisory controller 208 queries one or more applications 206 for preferred timeout periods associated with the hardware component 218 and stores the preferred timeout periods associated with the hardware component 218 in the data store 209.

In an implementation, the power management arbitrator 210 enforces a timeout period for the hardware component 218 received from an aggregated power management arbitrator. If there is no activity on the hardware component 218 during the timeout period, then the power management arbitrator 210 causes the hardware component 218 to transition to a low-power (or lower-power) mode. The length of the timeout period for hardware component 218 may be chosen according to the algorithms disclosed herein. Control of the power state of the hardware component 218 and setting the timeout period of the hardware component 218 (and other hardware components that are part of the device 202) may be on a per device basis, a per application or application type basis, on a battery status basis, on a user preference basis, on a device feedback basis, on a recent history basis, etc.

The power management supervisory controller 208 may further enforce a wakeup period for the hardware component 218 received from an aggregated power management arbitrator. Control of the power state of the hardware component 218 and setting the wakeup period of the hardware component 218 (and other hardware components that are part of the device 202) may also be on a per device basis, a per application or application type basis, on a battery status basis, on a device feedback basis, on a recent history basis, etc.

In at least one implementation, the power management arbitrator 210 causes the hardware component 218 to transition between power modes by communicating with a hardware sublayer 212 and/or a hardware driver 214. In the case where the hardware component 218 is a network adapter, the hardware sublayer 212 may include an NDIS API and the hardware driver 214, referred to in one example as a miniport driver. Other hardware sublayers 212 and hardware drivers 214 may be appropriate for other types of hardware components 218. In an implementation, the power management arbitrator may set a timer in one of the lower levels (e.g., the hardware sublayer 212 and/or the hardware driver 214) to manage transitioning the hardware component 218 to a low-power mode such that the hardware sublayer 212 and/or the hardware driver 214 will transition the hardware component 218 to the low-power mode without action by the power management arbitrator 210, the power management supervisory controller 208, or other parts of the OS 204.

In at least one implementation, the power management supervisory controller 208 communicates with a policy store that stores priority information for one or more applications executing on OS 204. The priority information in the policy store may be static or configurable. Where configurable, the priority of an application may be configured by a user (such as during or after install), by a group policy, or by another mechanism. Some applications may have a statically assigned priority. Based on the application priority in the priority store and the power state of the device 202, the aggregated power management arbitrator may set timeout and wakeup periods, responsive to the requests or attempts from the applications executing on OS 204 to use the hardware component 218.

Figure 3:
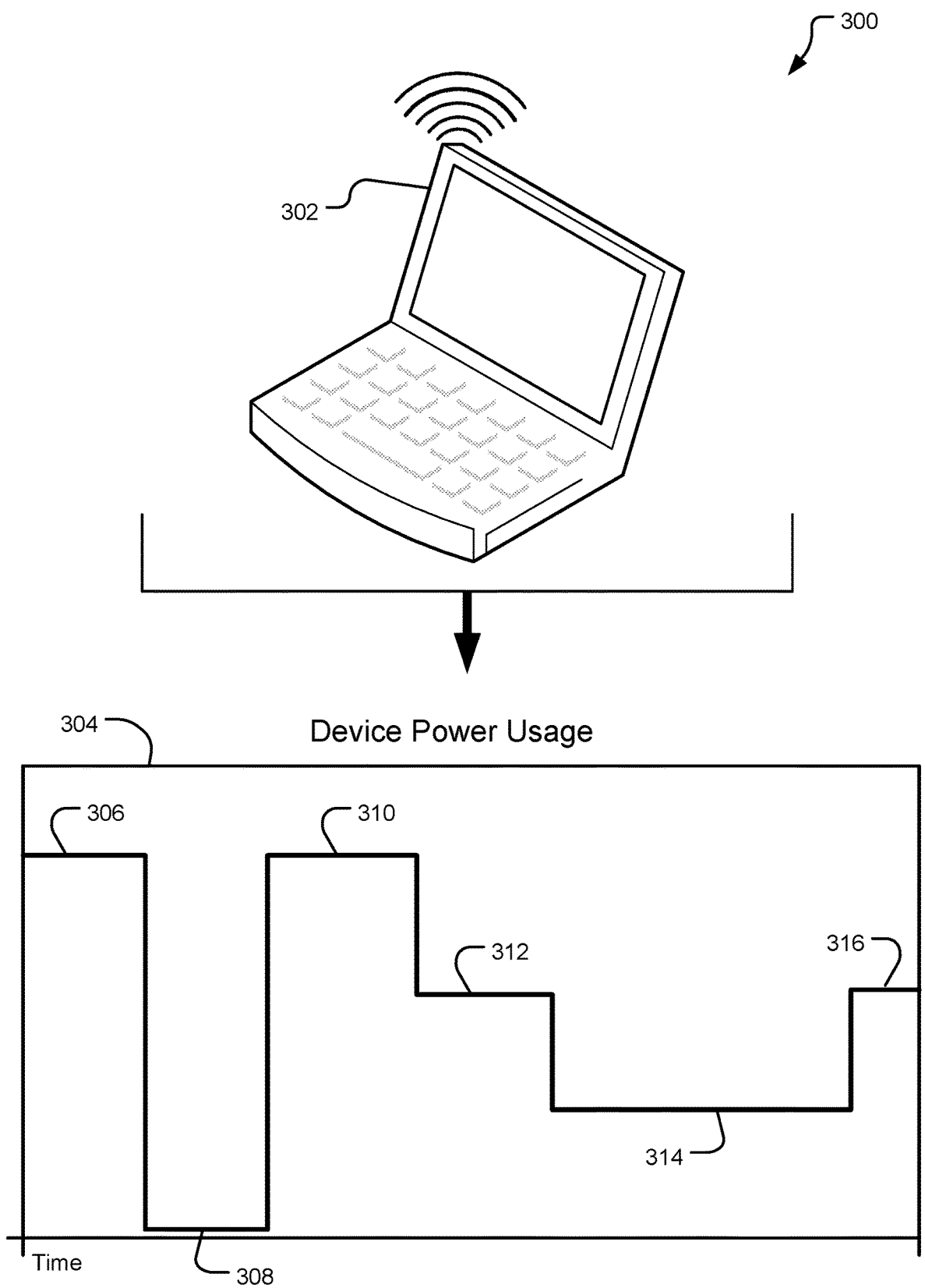
FIG. 3 illustrates an example environment for aggregated power management of a client device with a power usage plot.

FIG. 3 illustrates an example environment 300 for aggregated power management of a device 302 with a power usage plot 304. The device 302 is an electronic device with an OS and one or more system hardware components (not shown) that are capable of transitioning between one or more high-power modes and low-power modes.

Device 302 includes a power management supervisory controller and a power management arbitrator. In an implementation, the power management supervisory controller is associated with a higher level of the OS on the device 302, and the power management arbitrator is associated with a lower level of the OS on the device 302. The power management arbitrator may transition system hardware components between various power modes by controlling a hardware sublayer, a hardware driver, and/or a component of the data link layer of the OS associated with the hardware system device. In an implementation, the power management arbitrator need not communicate with the power management supervisory controller or other components of the OS on electronic device 302 to effect power state transitions of system hardware components.

The OS of device 302 manages the applications in the system that utilize system services, including, for example, network services, video display, audio output, etc. Network adapters will be a focus of the description herein, but the supervisory power management features described may apply to any other system hardware components as well. Hence, the OS is aware whether the network will be needed by monitoring applications and OS modules that depend on the network adapter. This management represents a supervisory state that the OS of device 302 can apply to individual network adapters, based on the need for each rather than relying on registration of application for the network adapters. As applications begin and end execution, the OS tracks the hardware component's overall network need, which network devices (or media) are needed, and the load status of the network devices. The OS of device 302 informs a component such as a low-level OS arbitrator, an NDIS API, and/or a miniport driver whether the network is needed by the applications. If the network is not needed, the network adapter is transitioned to low-power.

When the OS of device 302 indicates that the network is needed by applications or services, the OS still does not know the actual network demand. The system applications and operating modules calling for network usage, therefore, benefit from a separation of higher-level components of the OS of device 302 from the low-level OS components such as the network adapter, arbitrator, etc. Accordingly, network adapter power management can be controlled at the lowest possible layer in the network stack. If the upper-level OS indicates that network services are not needed, the network adapter can be transitioned to low-power. However, when the OS indicates that applications or services do require the network, it is still possible, or even likely, that there are periods where the network is not actually needed because applications often register with the OS for control of a system hardware component even if it is not needed for periods of time by the application. During these periods of network inactivity, the network adapter can be transitioned to low-power. Usually, these periods of inactivity are quite short, often several such periods per second. The sum of these inactive periods is typically larger than the periods of actual network use. Transitioning to low-power for these periods saves a significant portion of power the network adapter would otherwise be using.

Decoupling the management of network power state and actual network adapter power state is controllable from both a system-wide and per-device basis. In devices that respond poorly to idle detection power transitions of system hardware components, a system-wide override will mitigate poor idle detections. Similarly, individual device manufacturers may deem it risky to allow the duty cycle of power transitions to negatively impact their devices. Other reasons also exist for not wanting a particular device to respond to idle detection power transitions. Hence, a mechanism exists for device vendors to override idle detection operating against their devices.

Determining whether a system hardware component of device 302 is idle may be done per one or more algorithms that can be used separately or in various combinations. In one implementation, a fixed or variable timeout period may be used to determine whether a system hardware component is idle. In the example of a network device, the trigger to transition to a low-power state is when the network is idle for a timeout period. Typically, the length of the timeout period is dependent on the latency of the network adapter startup and the power consumed during transitions versus steady state operation. For example, a system hardware component with a shorter startup time that consumes relatively little power when transitioning between a low-power and a high-power state compared to remaining in a high-power state may weigh in favor of a shorter timeout period to avoid leaving the system hardware component in a high-power state when it is not needed.

As used herein, an inactivity condition may refer to a level of activity of a hardware component that is zero, near-zero, or below a threshold level of activity. For example, a network adapter may satisfy an inactivity condition if it transmits or receives no packets to or from a host during a time period even if the network adapter is performing other functions such as running a timeout and/or wakeup timer, "listening" for certain types of packets, and/or communicating with a host. In some implementations, a network adapter may send or receive packets on behalf of a host during a timeout period and still satisfy the inactivity condition if the number and/or type of packets are below a threshold value.

As used herein, a transition condition may depend on a timeout period and the activity of a hardware component during that period. For example, a transition condition may be satisfied if an inactivity condition is satisfied during a timeout period. In some implementations, a transition condition may be satisfied if a hardware component satisfies an inactivity condition during a timeout period and there are no applications that have indicated a need to use the hardware component in a time period after the timeout period. In another implementation, a transition condition may be satisfied if a hardware component doesn't satisfy an inactivity condition during a timeout period but user preferences indicate an aggressive power saving preference wherein a hardware component should be deemed to have satisfied the transition condition if the hardware component's activity during the timeout period is below a predetermined level or if the hardware component's activity is of a certain type during the timeout period. In another implementation, a transition condition is satisfied when there is no monitored activity information during the timeout period, and the hardware component is idle at the end of the timeout period.

In another implementation, a transition condition is satisfied when the hardware component has a maximum amount of activity during the timeout period. Other elements of the transition condition may also be used.

In another implementation, a fixed or variable wakeup period may be used to determine whether a system hardware component of device 302 that has been in a low-power state may be transitioned to a high-power state or to re-check whether operating conditions have changed sufficiently to justify a transition to a high-power state. A choice of length of the wakeup period may be dependent on the latency of the network adapter startup and the amount power consumed during transition of the system hardware component compared to steady state operation. For example, a system hardware component with a longer startup time that consumes significantly more power when transitioning between a low-power and high-power state compared to remaining in a high-power state may weigh in favor of a longer wakeup period to avoid excessively waking the device.

In another implementation, the length of the timeout period to trigger the transition of a system hardware component of device 302 (e.g., a network adapter) to a low-power state when the network is idle and/or the length of the wakeup period to trigger the transition of the system hardware component from a low-power state to a high-power state may be determined by the class/type of applications running on the device. For example, a video streaming application that burst short portions of network traffic may be optimized for different timeout periods and wakeup periods than an audio application that downloads one song at a time and then remains idle until the next song downloads. In at least one implementation, a low-level arbitrator may determine the relevant time periods without resort to high-levels of the operating system.

In another implementation, the length of the timeout period to trigger the transition of a system hardware component of device 302 (e.g., a network adapter) to a low-power state when the network is idle and/or the length of the wakeup period to trigger the transition of the system hardware component from low-power to a high-power state may be determined based on the durations of recent periods, in the case of a network adapter, of network transmission compared to periods of network idle. If a set of recent periods of network transmission are cached, then a weighted algorithm or a decaying value algorithm may be used to determine the length of upcoming expected periods of network transmission for which the system hardware component (e.g., the network adapter) should be in a high-power state.

In another implementation, the length of the timeout period to trigger the transition of a system hardware component (e.g., a network adapter) of device 302 to a low-power state when the network is idle and/or the length of the wakeup period to trigger the transition of the system hardware component from low-power to a high-power state may be determined based on an available battery state. As such, the length of the timeout and/or wakeup periods may become more aggressive as the remaining battery power declines. The aggressiveness of the lengths of the timeout period and wakeup period is limited by the baseline power consumed by transitions.

In another implementation, the length of the timeout period to trigger the transition of a system hardware component (e.g., a network adapter) of device 302 to a low-power state when the network is idle and/or the length of the wakeup period to trigger the transition of the system hardware component from low-power to a high-power state may be determined based on feedback from a system hardware component. In the case of a network adapter, the responsiveness of the network adapter to transitions between low-power and high-power states and the power consumer by the network adapter in transitioning between those states may be communicated through the network driver to the OS to determine an optimal length of time for the timeout period and/or the wakeup period.

In another implementation, the length of the timeout period to trigger the transition of a system hardware component (e.g., a network adapter) of device 302 to a low-power state when the network is idle and/or the length of the wakeup period to trigger the transition of the system hardware component from low-power to a high-power state may be determined based on user input. An OS may allow the user to input information to the OS regarding the nature of the length of the timeout period to be used. If the available battery power of the device reaches a threshold, the OS may present a user interface to the user to collect a "hint" from the user regarding the user's power management preferences. For example, if a user wishes for a system hardware component to have good performance, the user may select a less aggressive timeout and/or wakeup period to preserve performance at the cost of remaining battery life. On the other hand, a user may select a more aggressive timeout and/or wakeup period if the user wishes to maximize battery life at the cost of performance due to more frequent transitions between high and low-power states of a system hardware component.

In another implementation, the length of the timeout period to trigger the transition of a system hardware component (e.g., a network adapter) of device 302 to a low-power state when the network is idle and/or the length of the wakeup period to trigger the transition of the system hardware component from low-power to a high-power state may be determined based on the input of an arbiter. The power management arbitrator is a low-level OS module that determines the contribution and effect of the various available algorithms for determining the length of the timeout and/or wakeup periods.

In another implementation, the length of the timeout period to trigger the transition of a system hardware component (e.g., a network adapter) of device 302 to a low-power state when the network is idle and/or the length of the wakeup period to trigger the transition of the system hardware component from low-power to a high-power state may be determined based on application type usage and/or the state of the application. If an application has registered with the OS to use the system hardware component, then the timeout period may be set based on the expected needs of the application with respect to the system hardware component. For example, if a multi-player online game application has registered with the OS to use the network adapter, then a longer timeout period may be set because network latency in an online gaming application is likely to degrade the user experience due to lag between the user and other players in the game. If the state of the online gaming application changes, however, then a longer timeout period may be more appropriate. For example, if the user becomes inactive in the game and appears to be taking a break from play, then the lag issue is not as important as when the player was actively engaged, and a longer timeout period may be acceptable. Other examples of application type and application state affecting the timeout and/or wakeup period include a video application that is displaying video at a requested frame rate to the user. If the video application is playing the video, it may be assumed that the user is watching the video and the video adapter should not be transitioned to a low-power state. On the other hand, if the user pauses the video and/or selects the windows of other applications executing on the device (e.g., the video application window is partially or completely obscured by other windows), then a shorter timeout period may be appropriate. In an implementation, the video adapter has multiple intermediate power modes such that the video adapter may be transitioned into an intermediate power state to support video applications that do not demand a high frame rate.

Implementations of the present application include a network power module, integrated within an operating system of device 302, which controls the use of networking hardware during various power states of a device. Applications register with the network power module. The network power module accesses a policy store to determine a priority of the application. The application's priority may be static or configurable. The network power module also determines a power state of the device, which may be defined in various ways without departing from the scope of implementations. The network power module—based on power state, application priority, or other factors such as remaining battery power, application state, device user interface (UI) state—enables the network communication hardware to be powered up to receive and transmit data.

In some implementations, the network power module sets a timer in certain power states—such as in high-power states. The timer establishes a timeout period, which may be adaptable, during which the device and/or the network communication hardware remains powered up, and traffic may be sent. After the timeout timer expires, the device and/or the network communication hardware revert into a low-power state. The arrival of additional high-priority traffic may cause a currently running timer to increase remaining time or to be reset, to give more time for the traffic to be transmitted. Low-priority traffic may be transmitted or received during the timer period. Low-priority traffic may be queued for transmission until the communication hardware is activated. In some implementations, lower-priority traffic may cause the network power module to activate the network communications hardware if a threshold amount of lower-priority traffic queues for transmission. The timeout period may be adjustable based on application operational requirements, upper-level OS operational requirements, hardware component activity, and other factors.

In some implementations, the network power module sets a timer in certain power states—such as in low-power states. The timer establishes a wakeup period, which may be adaptable, during which the device and/or the network communication hardware remains in a low-power state. After the wakeup timer expires, the device and/or the network communication hardware revert into a high-power state or re-evaluated operational information and hardware device activity to determine whether to transition to a high-power state, to adjust a timeout period or to adjust the wakeup period. It should be understood that detected hardware device activity or high-priority demand (e.g., by an application or OS module) may trigger a transition to a high-power state independent of the state of the wakeup period time. The wakeup period may be adjustable based on application operational requirements, upper-level OS operational requirements, hardware component activity, and other factors.

Plot 304 illustrates an overall power usage level of the device 302 during various phases of operation. The y-axis of plot 304 indicates overall power usage level of the device 302 and the x-axis of plot 304 indicates time. Point 306 illustrates a period of time during which the device 302 is consuming a higher level of power. Point 308 illustrates a period of time during which the device 302 is consuming a low level of power due to the transitioning of one or more system hardware components to a low-power mode, such as, for example, after the expiration of a timeout period. Point 310 illustrates a return to higher level of power consumption by device 302, such as, for example, at the end of a wakeup period of one or more system hardware components. Point 312 illustrates a medium level of power consumption by device 302, such as when one or more system hardware components have been transitioned to a low-power mode, but not as many system hardware components as were transitioned at point 308. Alternatively, point 312 may illustrate a power consumption level represented by one or more system hardware components in an intermediate power state that is between a high-power state and a low-power state. Point 314 illustrates a return to a lower level of power consumption by device 302, such as when a user has indicated a preference for longer battery time over performance, and an arbitrator has transitioned one or more system hardware components into low-power states. Point 316 illustrates an increase in power consumption by device 302, such as when a wakeup period has concluded and one or more system hardware components transition into higher-power modes.

Figure 4:
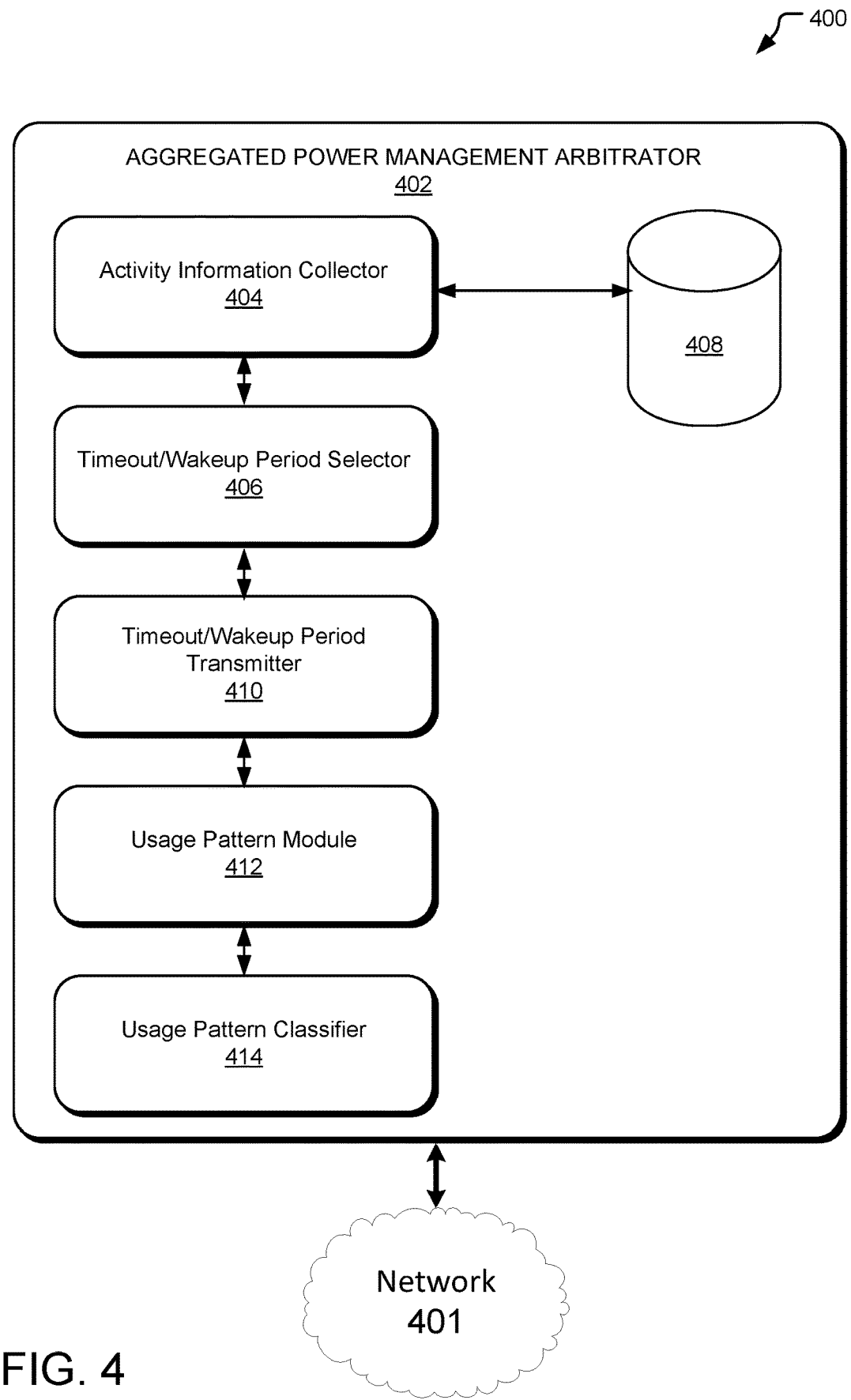
FIG. 4 illustrates an example environment for aggregated power management on an aggregated power management arbitrator.

FIG. 4 illustrates an example environment 400 for aggregated power management on an aggregated power management arbitrator 402. The aggregated power management arbitrator 402 is communicatively coupled to a plurality of electronic devices via a network 401 and is operable to collect activity information from the electronic devices and communicate timeout and/or wakeup periods to the devices, which may include transmitting timeout and/or wakeup periods to the system of supervisory power management located on the electronic devices. The aggregated power management arbitrator 402 includes components that perform a variety of functions. One of the components of the aggregated power management arbitrator 402 is the activity information collector 404. The activity information collector 404 monitors and collects activity information from the plurality of electronic devices via the network 401 regarding their use of a type of system hardware component such as hardware component. The activity information collected from the electronic devices by the activity information collector 404 may include different types of information describing the state and usage history of system hardware components on the plurality of electronic devices. For example without limitation, the collected activity information may include a length of time that a hardware component has spent in a higher or lower-power state over a period of time, the number of transitions the hardware component has made between power states, the number of transitions the hardware components has made from a higher-power state to a lower-power state over a period of time, which power states a hardware component was in over a period of time, the total amount of power consumed by a hardware component over a period of time, etc. The activity information collector 404 may also collect other information regarding the plurality of electronic devices including without limitation hardware and/or software versions and revisions, hardware versions of hardware components, the identity of applications executing on an OS executing on the electronic devices, the length of time certain applications executed on OS executing on the electronic devices, the amount of processing cycles used by certain applications executed on OS, etc. In an implementation, the activity information collector is in communication with a data store 408. The data store 408 may be used to store current and historical collected activity information, among other information as described herein.

Another component of the aggregated power management arbitrator 402 is the timeout/wakeup period selector 406. The timeout/wakeup period selector 406 sets a timeout and/or wakeup period associated with the use of a type of hardware component on one of the plurality of electronic devices. The timeout/wakeup period selector 406 may rely on various pieces of information to set the timeout/wakeup period for a particular one of the plurality of electronic devices. For example, the timeout/wakeup period selector 406 may set a timeout/wakeup period for one of the plurality of electronic devices based on the configuration of the electronic device. In an implementation, the configuration of an electronic device includes the number, type, and/or versions of hardware and software components of the electronic device. Data relating to the configuration of an electronic device may be stored at the aggregated power management arbitrator in the data store 408 and accessible to the timeout/wakeup period selector 406 and the other components of the aggregated power management arbitrator. For example, without limitation, the data store 408 may include timeout/wakeup periods associated with a network adapter model and dependent on other information included in the collected activity information for electronic devices including that model of network adapter such as current battery level, whether the electronic device is charging, usage patterns of the electronic device, etc.

Another component of the aggregated power management arbitrator is the usage pattern module 412. The usage pattern module 412 is configured to determine a plurality of potential usage patterns in the plurality of electronic devices. In the example of a system hardware component of one of the plurality of electronic devices is a network adapter, the usage pattern module 412 may determine a plurality of usage patterns associated with the network adapter. For example, without limitation, one of the plurality of electronic devices may include a network adapter that is capable of multiple power consumption states, and, based on the collected activity information, appears to be in a state of use wherein one or more applications executing on the electronic device requests shorts bursts of network traffic punctuated by longer periods of network inactivity such as when a user is creating a document in a word processor application while listening to music on a streaming music application. In this scenario, the word processor may request little to no use of the network adapter while the streaming music application requests short bursts of network activity to download and queue the next song in a playlist punctuated by periods of time during which the network adapter is not needed. This usage scenario could be determined to be a potential usage pattern by the usage pattern module based on analysis of collected activity information and stored in the data store 408 or it could be determined to be a potential usage pattern by developers who have identified and programmed the usage pattern module 412 to recognize such a pattern in the collected activity information.

Another example of a potential usage pattern is when a user is executing a video game application. It may be important to the user to maintain a high frame rate of the application while playing, such as 60 frames per second. While the user is playing the game, the video adapter on the electronic device may be in a high-power mode to support the high frame rate. When the user pauses the game application or enters an idle state after stepping away from the keyboard, the video game application may still be executing, but without the need to support a high frame rate. In this scenario, the video adapter may be transitioned to a lower-power state until the user returns. The usage pattern module may identify this usage pattern when collected activity information that indicates the video game user has entered an idle state. Many other usage patterns are also possible based on any type of hardware component and any type of usage, either envisioned by developers of the aggregated power management arbitrator 402.

Determined usage patterns may be used to set and/or adjust a timeout period according to a variety of heuristic approaches. One heuristic approach to setting a timeout period is to collect user preference information from a user. If the aggregated power management arbitrator 402 sets a timeout period for a usage pattern, the timeout period could cause a hardware component to transition to a low-power state in a way that negatively affects the user experience for a user. For example, if the aggregated power management arbitrator 402 sets a timeout period for a video adapter that causes the video adapter to enter a lower-power state that reduces the frame rate of the video display, the lower frame rate may be undesired by a user. The electronic device may present a graphical user interface to the user to collect user preference information regarding the transition to the lower-power state. A user may express the preference via the graphical user interface that the user wishes the video adapter not to transition to a lower-power state if the transition would lower the video adapter's frame rate. The aggregated power management arbitrator 402 may utilize the user preference information to adjust the timeout period for the video adapter (e.g., lengthen it) such that the user does not encounter the lowered frame rate.

Another heuristic approach to setting a timeout period is to set heuristic test values for timeout periods. If the aggregated power management arbitrator 402 sets a timeout period for a usage pattern, data regarding the power efficiency of the electronic device may be collected to provide empirical data on the effect of the chosen timeout period value. The empirical data may include values including, without limitation, the number of transitions of hardware component between a higher-power state and a lower-power state, the amount of time the hardware component spends in the various available power states, the energy consumed by the hardware component over a period of time, whether the user has expressed a preference for the hardware component during the time period, etc. After the empirical data regarding the efficiency of the electronic device operating in the usage pattern with the chosen timeout period has been collected, the aggregated power management arbitrator 402 may adjust the timeout period to heuristic test values for a test period of time. During the test period of time, additional empirical data is collected and compared to the initial empirical test data to determine whether the test heuristic value of the timeout period results in improved energy efficiency, degraded energy efficiency, or no change to the energy efficiency compared to the initial timeout period. If a test heuristic timeout period results in improved energy efficiency, the aggregated power management arbitrator 402 may use the test timeout period as a new chosen timeout period for the associated usage pattern.

Other components of the aggregated power management arbitrator 402 include a usage pattern classifier 414 and a timeout/wakeup period transmitter 410. The usage pattern classifier 414 is configured to analyze collected activity information, such as activity information stored in the data store 408, to classify a usage pattern for a particular one of the plurality of electronic devices. The timeout/wakeup period transmitter 410 is configured to communicate with the plurality of electronic devices to transmit one or more timeout and/or wakeup periods via the network 401.

Figure 5:
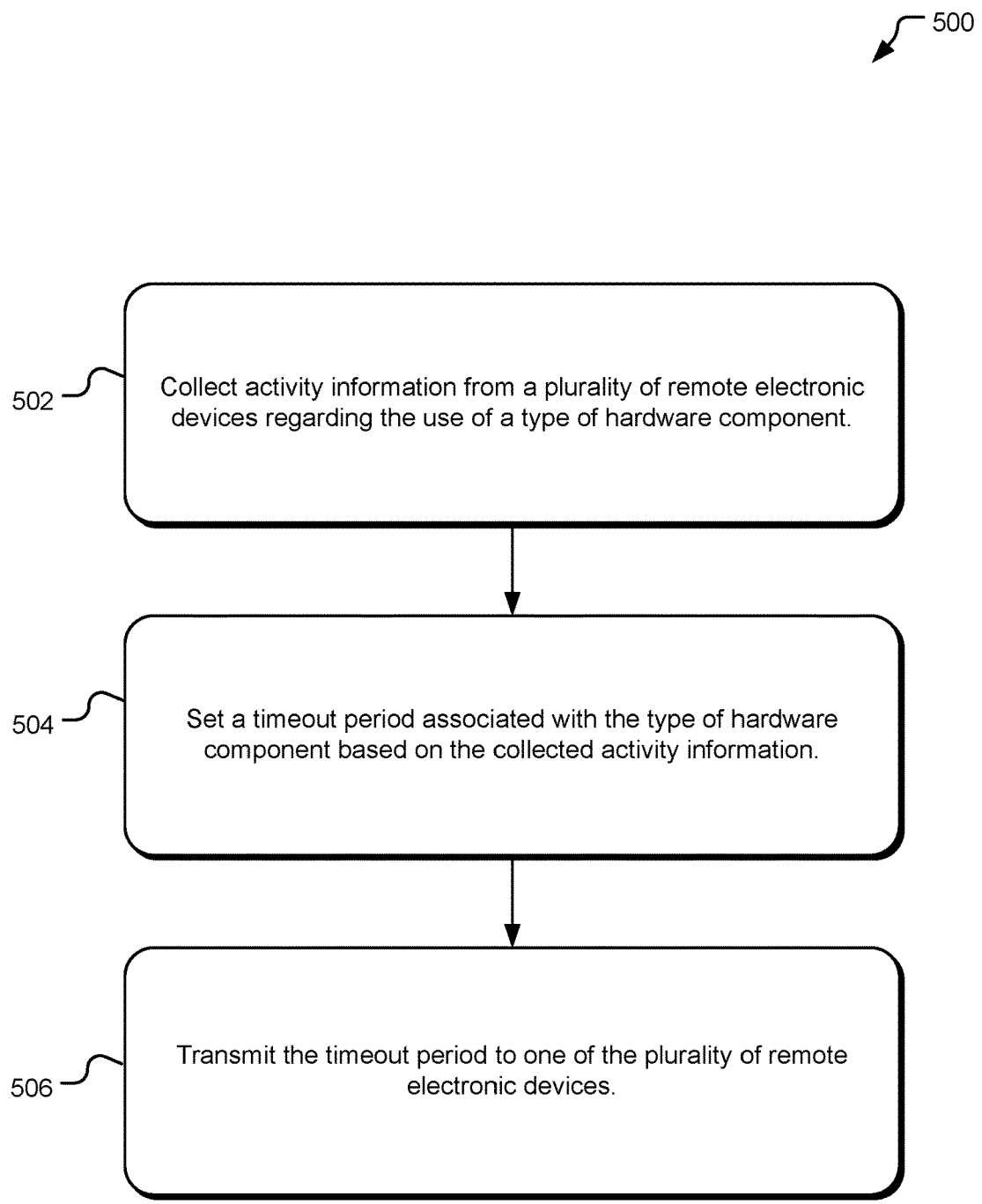
FIG. 5 illustrates a flow diagram showing example operations for aggregated power management of remote electronic devices.

FIG. 5 illustrates a flow diagram 500 showing example operations for aggregated power management of remote electronic devices. A collecting operation 502 collects activity information from a plurality of remote electronic device regarding the use of a type of hardware component on each of the plurality of remote electronic devices by one or more applications executing on each of the plurality of remote devices. Activity information of a hardware component may include various types of information regarding the hardware component. For example, activity information may include load information on the hardware component, a state of the hardware component, and/or a usage level of the hardware component. In an implementation, the hardware component includes a network adapter, and activity information regarding the network adapter can include at least transmission information, receive information, and control information suitable to change a state of the network adapter such as the network adapter's power state and/or parameters of the network adapter such as multicast address, data rate, MAC address, etc.

The collecting operation 502 may be performed by an activity information collector on an aggregated power management arbitrator that is remote from the plurality of electronic devices. The collecting operation 502 may include storing the collected activity information in a data store for use by other components of the aggregated power management arbitrator such as a timeout period selector, a usage pattern module, a usage pattern classifier, a timeout period selector, etc. The collecting operation 502 may include collecting information regarding the activity of a hardware component on one of the plurality of electronic devices (e.g., network traffic on a network adapter, frame rate on a video adapter, etc.) as well as collecting information regarding the type of application requesting usage of a hardware component on one of the plurality of electronic devices. For example, the collecting operation 502 may include monitoring the type of application requesting usage of a hardware component, historical usage data regarding the usage of the hardware component, available battery status on the device, power consumption of the hardware component, feedback from the hardware component itself, user preference data regarding power management preferences, etc.

A setting operation 504 sets a timeout and/or wakeup period associated with the use of the type of hardware component by the one or more applications based on the collected activity information. The timeout period defines a minimum amount of time before a power state of the type of hardware component is transitioned from a higher-power state to a lower-power state. The setting operation 504 may be performed by a timeout/wakeup period selector on an aggregated power management arbitrator. A timeout and/or wakeup period in the setting operation 504 may be determined based on current and/or historical activity information, such as information stored in a data store at the aggregated power management arbitrator. In another implementation, a timeout and/or wakeup period in the setting operation 504 may be determined based on usage patterns determined by a usage pattern module on the aggregated power management arbitrator. In yet another implementation, the timeout and/or wakeup period in the setting operation 504 may be determined based on power management information stored in the data store on the aggregated power management arbitrator, such as, for example, power management information supplied by publishers of the OS executing on the plurality of electronic devices, publishers of applications executing on the plurality of electronic devices, manufacturers of hardware components on the plurality of electronic devices, OEM manufacturers of the electronic devices, etc.

A transmitting operation 506 transmits the timeout/wakeup periods set by the setting operation 504 to one of the plurality of electronic devices executing the one or more applications to control power management of the one of the plurality of electronic devices. In an implementation, the aggregated power management arbitrator is located remotely from the plurality of electronic devices, and the transmitting operation 506 is performed by communicating the timeout period to one of the plurality of electronic devices via a network.

In an implementation, the setting operation 504 may further include a determining operation that determines a plurality of usage patterns in the plurality of electronic devices executing one or more applications based on the activity information collected in the collecting operation 502. Each of the usage patterns defines a usage pattern of a type of hardware component on one of the plurality of electronic devices. For example, if one of the plurality of electronic devices includes a network adapter, the determining operation determines a plurality of usage patterns associated with the network adapter. For example, without limitation, one of the plurality of electronic devices may include a network adapter that is capable of multiple power consumption states, and, based on the collected activity information, appears to be in a state of use wherein one or more applications executing on the electronic device requests shorts bursts of network traffic punctuated by longer periods of network inactivity such as when a user is creating a document in a word processor application while listening to music on a streaming music application. In this scenario, the word processor may request little to no use of the network adapter while the streaming music application requests short bursts of network activity to download and queue the next song in a playlist punctuated by a period of time during which the network adapter is not needed. This usage scenario could be determined to be a potential usage pattern by the usage pattern module based on analysis of collected activity information and stored in a data store at the aggregated power management arbitrator or it could be determined to be a potential usage pattern by developers who have identified and programmed the aggregated power management arbitrator to recognize such a pattern in the collected activity information.

Another example of a potential usage pattern determined by determining operation is when a user is executing a video game application. It may be important to the user to maintain a high frame rate of the application while playing, such as 60 frames per second. While the user is playing the game, the video adapter on the electronic device may be in a high-power mode to support the high frame rate. When the user pauses the game application or enters an idle state after stepping away from the keyboard, the video game application may still be executing, but without the need to support a high frame rate. In this scenario, the video adapter may be transitioned to a lower-power state until the user returns. The usage pattern module may identify this usage pattern when collected activity information that indicates the video game user has entered an idle state.

Determined usage patterns may include a power savings condition relating to the hardware component. In an implementation, a usage pattern may be associated with a target minimum number of power state transitions for a hardware component, such as a target minimum number of transitions from a higher-power state to a lower-power state over a period of time while the electronic device satisfies the usage pattern. In this example, the power savings condition is satisfied when the hardware component performs at least the target minimum number of transitions from a high-power state to a low-power state during the time period. For example, if an electronic device is determined to be in a usage pattern where the user is editing a document in a word processing application while listening to streaming music on a streaming music application, then that usage pattern may be expected to permit at least a minimum number of transitions of the network adapter from a higher-power state to a lower-power state because the network adapter should need only to buffer the next song for the music application before it should be able to idle until it is time to buffer the next song. In another implementation, the usage pattern may include a power savings condition that is satisfied when the hardware component spends at least a target minimum percentage of time spent in a low-power state over a time period. In yet another implementation, the usage pattern may include a power savings condition that is satisfied when the hardware component consumes less than a target amount of power over a period of time. Other types of power savings conditions are also envisioned.

Determined usage patterns may include an excessive idle condition relating to the hardware component. In an implementation, a usage pattern may be associated with a maximum amount of time the hardware component should spend in a low-power state over a period of time while the electronic device satisfies the usage pattern. For example, if an electronic device is determined to be in a usage pattern where the user is editing a document on a word processing application while listening to streaming music on a streaming music application, then that usage pattern may be expected to still allow other applications executing on the electronic device to transmit and receive data over the network adapter at least to some extent. If the network adapter spends too much time in the low-power state, then these applications may not be able to send and receive the data according to a satisfactory user experience. Other types of excessive idle conditions include without limitation the number of transitions from a low-power state to a high-power state over a time period.

A classifying operation classifies the collected activity information of the one of the plurality of electronic devices executing the one or more applications as satisfying at least one of the plurality of usage patterns. The classifying operation may be performed by a usage pattern classifier on the aggregated power management arbitrator. In an implementation, the classifying operation analyzes collected activity information, such as activity information stored in a data store at the aggregated power management arbitrator, to classify a usage pattern for a particular one of the plurality of electronic devices from the plurality of usage patterns determined in the determining operation. An adjusting operation may adjust the timeout period set by the setting operation 504 based on the classified usage pattern.

Figure 6:
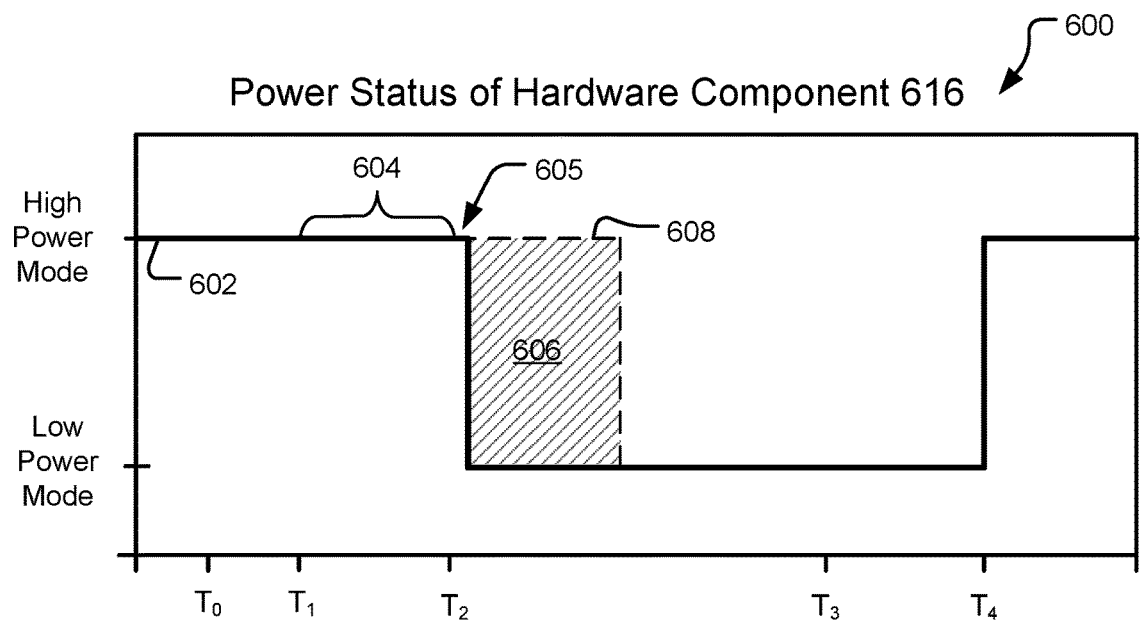
FIG. 6 is a plot of example power usage of a type of hardware component and a signal diagram illustrating interaction between the components of a client device under an aggregated power management environment.
Figure 6:
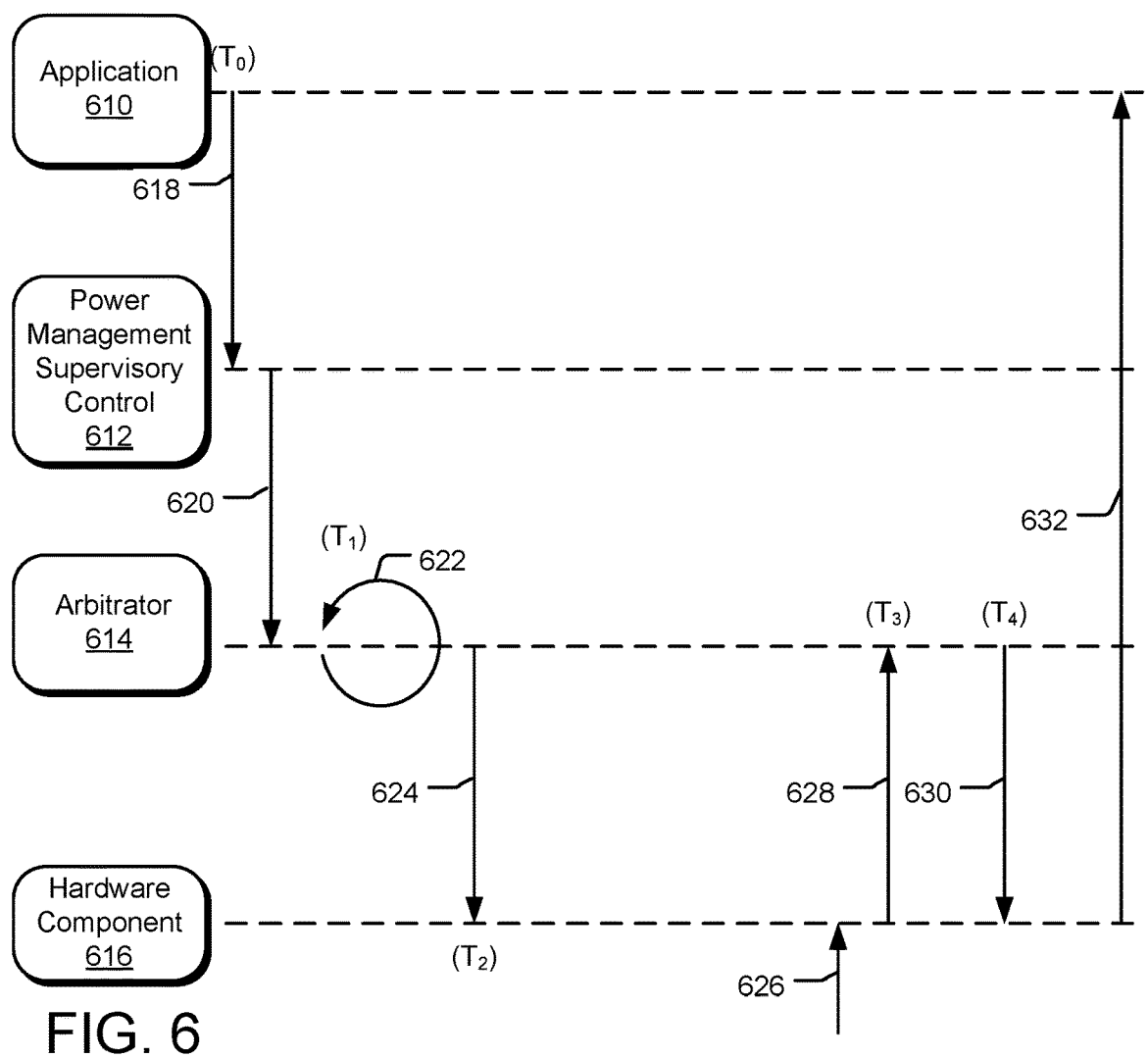

FIG. 6 is a plot of example power usage of a hardware component 616 and a signal diagram illustrating interaction between the components of a device utilizing supervisory control of power management in an aggregated power management environment 600. The plot includes a line 602 indicating whether the hardware component 616 is in a high-power mode or a low-power mode. In other implementations, the hardware component 616 has more than two power modes. The two power modes of the hardware component 616 used herein are exemplary. The x-axis of the plot indicates time, and the time markers $T_0$-$T_4$ are on the same scale as the communications shown in the signal diagram below the plot.

At a time $T_0$, an application 610 executing on the computing device communicates a request to use the hardware component 616 to the OS of the device. The request to use hardware component 616 is received in communication 618 by the power management supervisory controller 612. Shortly after time $T_0$, the power management supervisory controller 612 informs the arbitrator 614 of information regarding the request from application 610 to use hardware component 616 in communication 620.

Communication 620 may include a variety of information regarding application 610 and the request to use hardware component 616 such as application 610's type, information regarding power management user preferences, historical power management information regarding the device and/or application 610, current battery status, etc. Communication 620 may also include a timeout period for hardware component 616. The timeout period in communication 620 may be received from an aggregated power management arbitrator. In another implementation, communication 620 does not include a timeout period for hardware component 616.

At time $T_1$, the timeout period 604 for hardware component 616 begins. In an implementation, during the timeout period 604, the arbitrator 614 monitors usage of the hardware component 616 at operation 622. If the hardware component 616 is not used during the timeout period 604, then the arbitrator 614 transitions the hardware component 616 into a low-power mode at time $T_2$ via communication 624. A time shortly after time $T_2$ indicated by the arrow 605, the hardware component 616 is in a low-power mode as indicated by line 602.

Transitioning the hardware component 616 to a low-power mode at time $T_2$ is an improvement over other methods of power management that rely on application 610 to de-register its use of hardware component 616. The additional savings of supervisory power management in the form of an earlier transition of hardware component 616 is shown on the plot as area 606. Dashed line 608 indicates what the power status of hardware component 616 would have been if the device had relied on the application 610 to announce its relinquishment of the hardware component 616 instead of using the methods of supervisory power management disclosed herein.

In an implementation, the hardware component 616 may "listen" for an event that can trigger the hardware component 616 to transition to a different power mode. For example, if the hardware component 616 is a network adapter, the network adapter may scan only the headers of network packets for an indication that the hardware component 616 should wake up even though the hardware component 616 is in a low-power mode. Such a packet may be referred to as a "wake packet" received in communication 626. Upon receipt of the wake packet in communication 626, the hardware component 616 informs the arbitrator 614 in communication 628 at time $T_3$. In an implementation, the arbitrator may itself transition the hardware component 616 into a higher-power state in communication 630 at time $T_4$ without relaying the hardware component 616's receipt of the wake packet to higher levels of the OS, e.g., the power management supervisory controller 612, the application 610, or other parts of the OS. Upon receipt of communication 630 from the arbitrator 614 at time $T_4$, the hardware component 616 transitions to a higher-power mode and communicates network traffic to the application 610 in communication 632.

Figure 7:
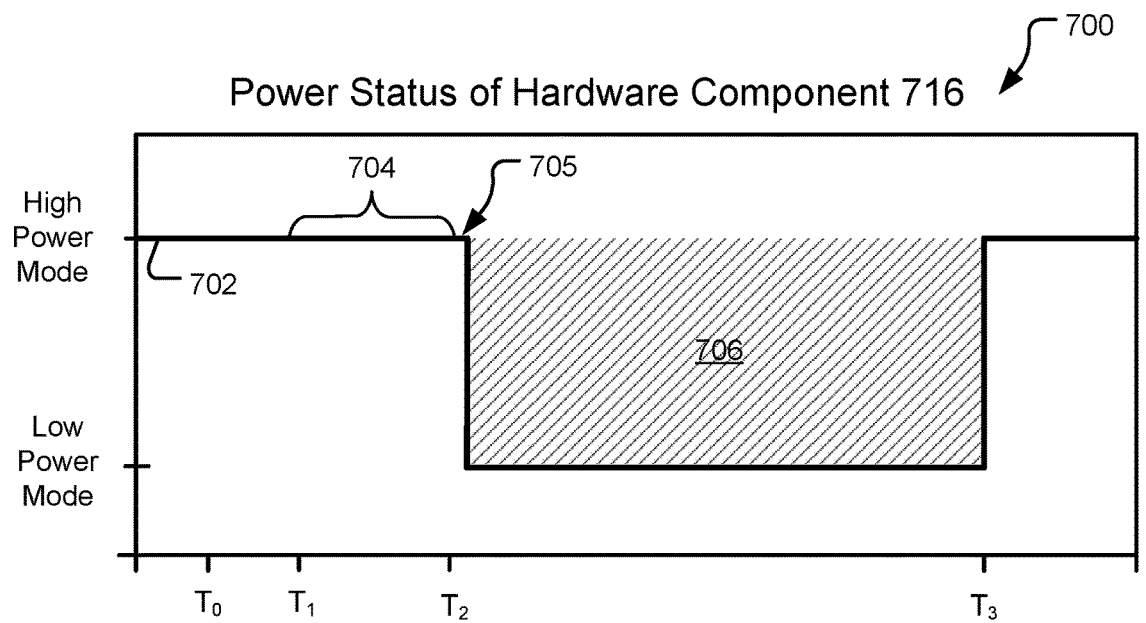
FIG. 7 is a plot of example power usage of a type of hardware component and a signal diagram illustrating interaction between the components of a client device under an aggregated power management environment.
Figure 7:
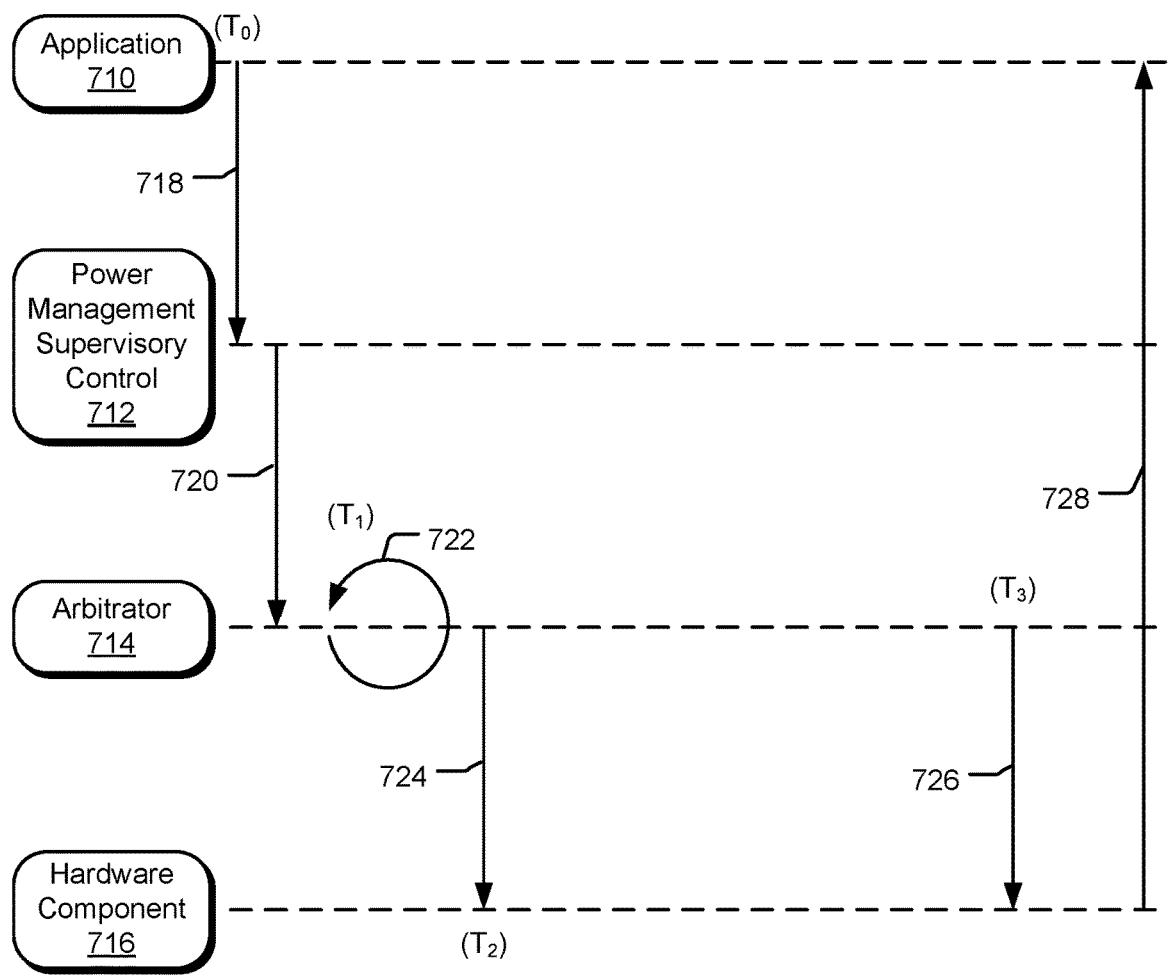

FIG. 7 is a plot of example power usage of a hardware component 716 and a signal diagram illustrating interaction between the components of a device utilizing supervisory control of power management in an aggregated power management environment 700. The plot includes a line 702 indicating whether the hardware component 716 is in a high-power mode or a low-power mode. In other implementations, the hardware component 716 has more than two power modes. The two power modes of the hardware component 716 used herein are exemplary. The x-axis of the plot indicates time, and the time markers $T_0$-$T_3$ are on the same scale as the communications shown in the signal diagram below the plot.

At a time $T_0$, an application 710 executing on the computing device communicates a request to use the hardware component 716 to the OS of the device. The request to use hardware component 716 is received in communication 718 by the power management supervisory controller 712. Shortly after time $T_0$, the power management supervisory controller 712 informs the arbitrator 714 of information regarding the request from application 710 to use the hardware component 716 in communication 720.

Communication 720 may include a variety of information regarding application 710 and the request to use hardware component 716 such as application 710's type, information regarding power management user preferences, historical power management information regarding the device and/or application 710, current battery status, etc. Communication 720 may also include a timeout period for hardware component 716 received from an aggregated power management arbitrator. In another implementation, communication 720 does not include a timeout period for hardware component 716.

At time $T_1$, the timeout period 704 for hardware component 716 begins. In an implementation, during the timeout period 704, the arbitrator 714 monitors usage of the hardware component 716 at operation 722. If the hardware component 716 is not used during the timeout period 704, then the arbitrator 714 transitions the hardware component 716 into a low-power mode at time $T_2$ via communication 724. A time shortly after time $T_2$ indicated by arrow 705, the hardware component 716 is in a low-power mode as indicated by line 702.

After the hardware component 716 has been transitioned to a low-power mode at time $T_2$, the arbitrator 714 sets a wakeup period 706 for the hardware component 716 represented by area 706 on the plot. The wakeup period 706 ends at time $T_3$ and arbitrator 714 sends a wakeup signal to hardware component 716 in communication 726. In one implementation, communication 726 transitions the hardware component 716 from the low-power mode to a high-power mode as indicated by line 702. In another implementation, communication 726 simply transitions hardware component 716 into an intermediate power mode (not shown on the plot) wherein the hardware component 716 checks to see whether there is a pending request from application 710, any other applications, the OS, or other components of the computing device to use the hardware component 716. If there is such a request, then hardware component 716 may remain in the high-power mode as shown by line 702 in the plot. If there is not such a request, then hardware component 716 may return to the low-power mode. If the hardware component 716 remains in the high-power mode, it may communicate with application 710 at communication 728.

Figure 8:
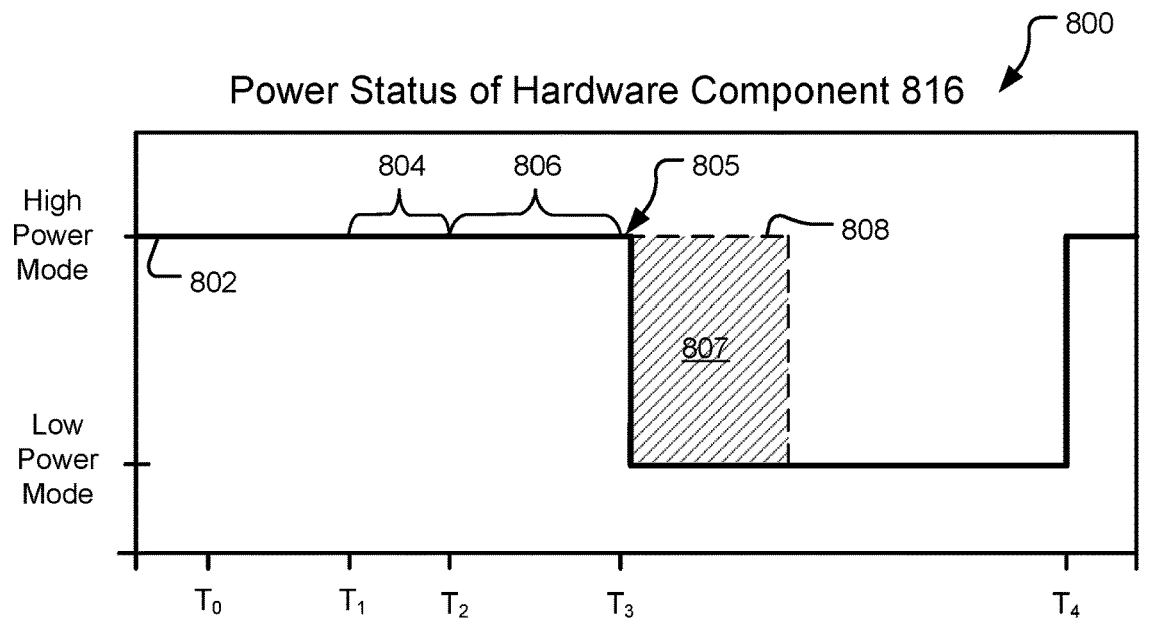
FIG. 8 is a plot of example power usage of a type of hardware component and a signal diagram illustrating interaction between the components of a client device under an aggregated power management environment.
Figure 8:
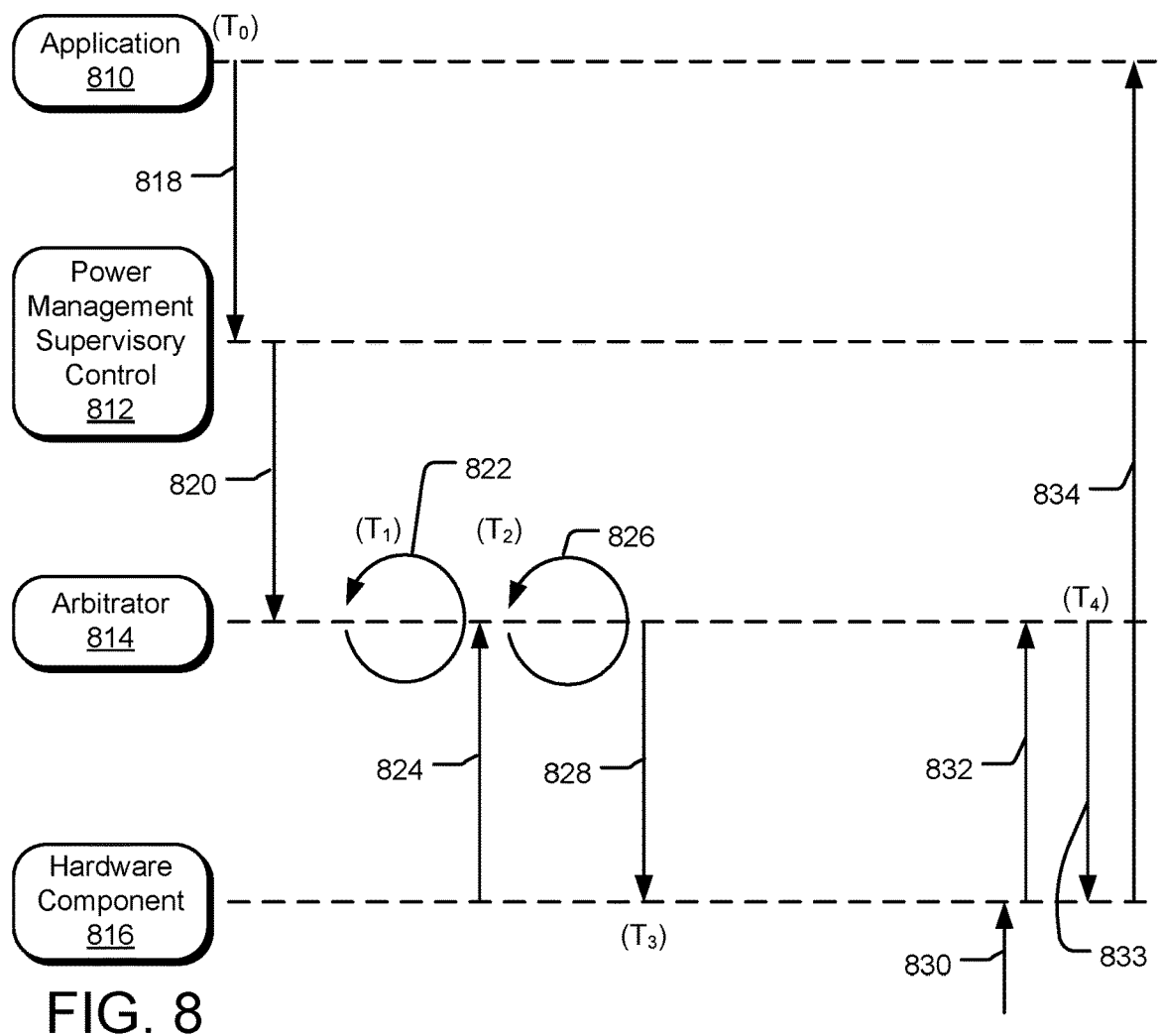

FIG. 8 is a plot of example power usage of a hardware component 816 and a signal diagram illustrating interaction between the components of a device utilizing supervisory control of power management in an aggregated power management environment 800. The plot includes a line 802 indicating whether the hardware component 816 is in a high-power mode or a low-power mode. In other implementations, the hardware component 816 has more than two power modes. The two power modes of the hardware component 816 used herein are exemplary. The x-axis of the plot indicates time, and the time markers $T_0$-$T_4$ are on the same scale as the communications shown in the signal diagram below the plot.

At a time $T_0$, an application 810 executing on the computing device communicates a request to use the hardware component 816 to the OS of the device. The request to use hardware component 816 is received in communication 818 by the power management supervisory controller 812. Shortly after time $T_0$, the power management supervisory controller 812 informs the arbitrator 814 of information regarding the request from application 810 to use hardware component 816 in communication 820.

Communication 820 may include a variety of information regarding application 810 and the request to use hardware component 816 such as application 810's type, information regarding power management user preferences, historical power management information regarding the device and/or application 810, current battery status, etc. Communication 820 may also include a timeout period for hardware component 816 received from an aggregated power management arbitrator. In another implementation, communication 820 does not include a timeout period for hardware component 816.

At time $T_1$, a first timeout period 804 for hardware component 816 begins. In an implementation, during the first timeout period 804, the arbitrator 814 monitors usage of the hardware component 816 at operation 822. During operation 822, the hardware component 816 becomes active at time $T_2$ and notifies the arbitrator 814 of the activity in communication 824. Receipt of communication 824 triggers the arbitrator 814 to reset the timeout period at time $T_2$ to a second timeout period 806. During the second timeout period 806, the arbitrator 814 monitors usage of the hardware component 816 at operation 826. If the hardware component 816 is not used during the timeout period 806, then the arbitrator 814 transitions the hardware component 816 into a low-power mode at time $T_3$ via communication 828. A time shortly after time $T_3$ as indicated by arrow 805, the hardware component 816 is in a low-power mode as indicated by line 802.

Transitioning the hardware component 816 to a low-power mode at time $T_3$ is an improvement over other methods of power management that rely on application 810 to de-register its use of hardware component 816. The additional savings of supervisory power management in the form of an earlier transition of hardware component 816 is shown on the plot as area 807. Dashed line 808 indicates what the power status of hardware component 816 would have been if the device had relied on the application 810 to announce its relinquishment of the hardware component 816 instead of using the methods of supervisory power management disclosed herein.

In an implementation, the hardware component 816 may "listen" for an event that can trigger the hardware component 816 to transition to a different power mode. For example, if the hardware component 816 is a network adapter, the network adapter may scan only the headers of network packets for an indication that the hardware component 816 should wake up even though the hardware component 816 is in a low-power mode. Such a packet may be referred to as a "wake packet" received in communication 830. Upon receipt of the wake packet in communication 830, the hardware component 816 informs the arbitrator 814 in communication 832 at time $T_4$. In an implementation, the arbitrator may itself transition the hardware component 816 into a higher-power state in communication 833 at time $T_4$ without relaying the hardware component 816's receipt of the wake packet to higher levels of the OS, e.g., the power management supervisory controller 812, the application 810, or other parts of the OS. Upon receipt of communication 833 from the arbitrator at time $T_4$, the hardware component 816 transitions to a higher-power mode and communicates network traffic to the application 810 in communication 834.

In at least one implementation, the first timeout period 804 may be superseded by the second timeout period 806 when a component of the system receives a signal indicating that the hardware component 816 is active, would not satisfy an inactivity condition, and/or would not satisfy a transition condition at time $T_2$. As such, the first timeout period 804 is "cut off" by the second timeout period 806 once it is known that the hardware component 816 will not transition to the low-power state at the end of the first timeout period 804. In another implementation, the first timeout period 804 may be allowed to run until its expiration even if it is known that the hardware component 816 did not satisfy a transition condition and/or an inactivity condition during the first timeout period 804. Instead, the first timeout period 804 is allowed to persist until it expired, and then the second timeout period 806 begins after the first timeout period 804 has completed.

Figure 9:
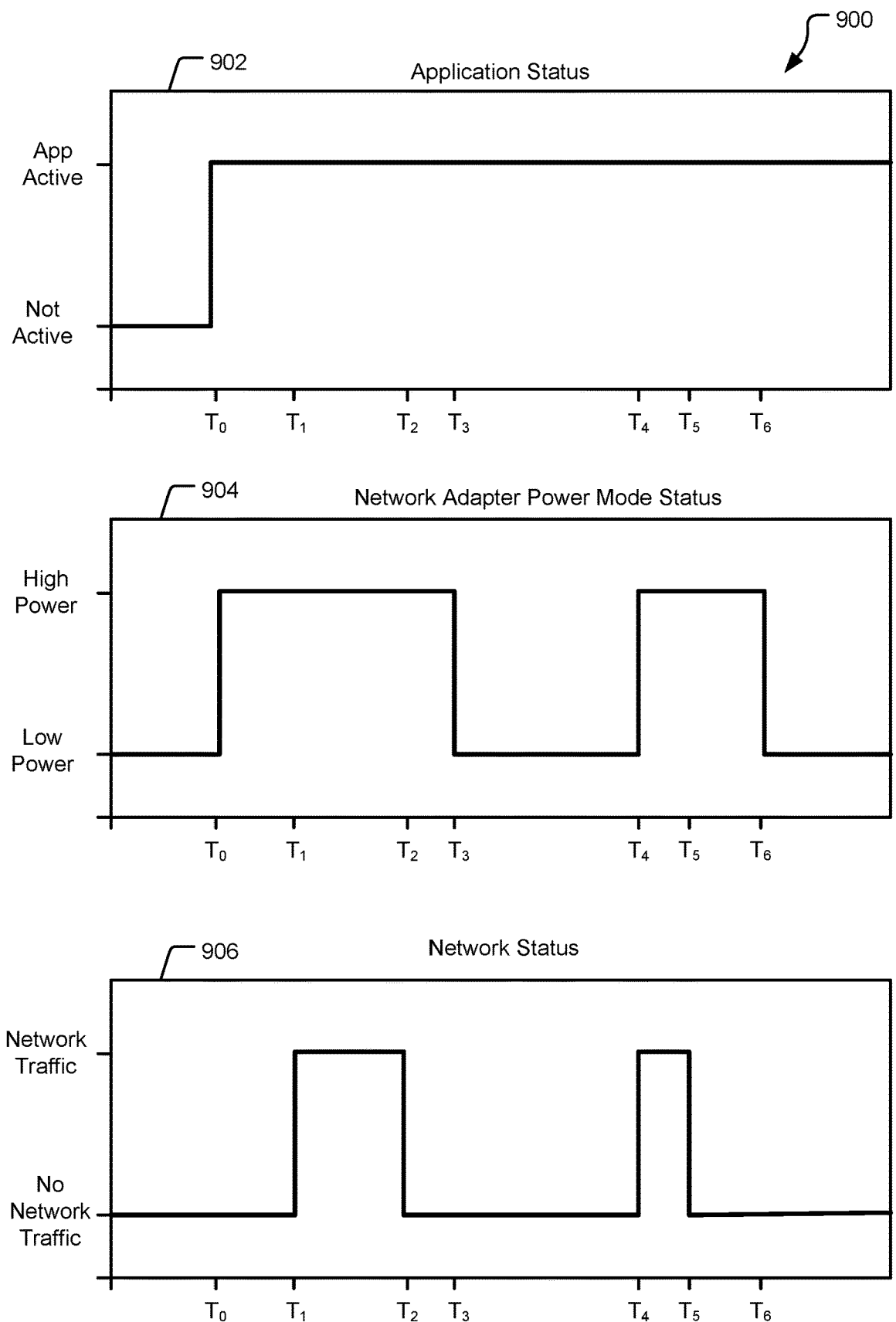
FIG. 9 illustrates plots of example power status of an application, type of hardware device, and network traffic of a device under an aggregated power management environment.

FIG. 9 illustrates plots of example power status of an application, hardware device, and network traffic of a device utilizing supervisory control of power management in an aggregated power management environment 900. In a first plot 902, an application is inactive at the beginning of the plot, becomes active at time $T_0$, and remains active for the remainder of the plot. Plot 904 indicates the power mode status of a hardware component, in this case, a network adapter. The network adapter is in a low-power mode until time $T_0$ when the application becomes active and requests use of the network adapter. Plot 906 shows network traffic over the network adapter. Network traffic is present starting at time $T_1$ until time $T_2$. At time $T_2$, network traffic ceases and a timeout period begins for the network adapter. At time $T_3$, the timeout period ends, and the network adapter transitions to a low-power state even though the application is still active and may not have de-registered its use of the network adapter. Later, between times $T_4$ and $T_5$, the network becomes active again and the network adapter transitions to a high-power state to service the network traffic. After time $T_5$, the network traffic again ceases and a timeout period begins for the network adapter, which transitions to a low-power mode again at time $T_6$ even though the application is still active and may not have de-registered its use of the network adapter.

An example method for aggregated power management of electronic devices includes collecting, at an aggregated power management arbitrator, activity information from one or more remote electronic devices regarding use of a type of hardware component on each of the one or more remote electronic devices by one or more applications executing on each of the one or more remote electronic devices, setting, at the aggregated power management arbitrator, a timeout period associated with the use of the type of hardware component by the one or more applications based on the collected activity information, the timeout period defining a minimum amount of time before a power state of the type of hardware component is transitioned from a higher-power state to a lower-power state, and transmitting, from the aggregated power management arbitrator, the timeout period to one of the one or more remote electronic devices executing the one or more applications to control power management on the one of the one or more remote electronic devices.

Another example method of any preceding method includes determining one or more usage patterns in the one or more remote electronic devices executing the one or more applications based on the collected activity information, each usage pattern in the one or more usage patterns defining a usage pattern of the type of hardware component by the one or more applications, classifying the collected activity information of the one of the one or more remote electronic devices executing the one or more applications as satisfying at least one of the one or more usage patterns, adjusting the timeout period associated with the type of hardware component by the one or more applications based on the classified collected activity information.

Another example method of any preceding method includes wherein at least one of the one or more usage patterns is associated with a power savings condition.

Another example method of any preceding method includes wherein the adjusting operation includes reducing a length of the timeout period until the activity information indicates that the type of hardware component on the one of the one or more remote electronic devices satisfies the power savings condition.

Another example method of any preceding method includes wherein satisfying the power savings condition includes a target minimum number of transitions of the type of hardware component from the higher-power state to the lower-power state.

Another example method of any preceding method includes wherein the target minimum number of transitions is based on activity information collected from others of the one or more remote electronic devices.

Another example method of any preceding method includes setting a wakeup period associated with the use of the type of hardware component by the one or more applications based on the collected activity information, the wakeup period defining at least a minimum amount of time before a power status of the type of hardware component is transitioned from the lower-power state to a different power state, and transmitting the wakeup period to the one of the one or more remote electronic devices to control power management of the one of the one or more electronic devices.

Another example method of any preceding method includes wherein the operation setting a wakeup period further comprises determining one or more usage patterns in the collected activity information, each usage pattern in the one or more usage patterns defining a usage pattern of the type of hardware component by the one or more applications, classifying the activity information of the one of the one or more remote electronic devices executing the one or more applications as one of the one or more usage patterns, and adjusting the wakeup period associated with the use of the type of hardware component by the one or more applications based on the one of the one or more usage patterns.

Another example method of any preceding method includes wherein at least one of the one or more usage patterns includes an excessive idle condition of the type of hardware component on the one of the one or more remote electronic devices.

An example apparatus includes an activity information collector configured to collect activity information from one or more remote electronic devices regarding use of a type of hardware component on each of the one or more remote electronic devices by one or more applications executing on each of the one or more remote devices, a timeout period selector configured to select a timeout period associated with the use of the type of hardware component by the one or more applications based on the collected activity information, the timeout period defining a minimum amount of time before a power state of the type of hardware component is transitioned from a higher-power state to a lower-power state, and a timeout period transmitter configured to transmit the selected timeout period to one of the one or more remote electronic devices, the one of the one or more remote electronic devices executing the one or more applications.

Another example apparatus of any preceding apparatus includes a usage pattern module configured to determine one or more usage patterns in the collected activity information of the one of the one or more electronic devices executing the one or more applications, each usage pattern in the one or more usage patterns defining a usage pattern of the type of hardware component by the one or more applications, a usage pattern classifier configured to classify the collected activity information of the one of the one or more electronic devices executing the one or more applications as satisfying at least one of the one or more usage patterns, and the timeout period selector being further configured to adjust the timeout period associated with the use of the type of hardware component by the one or more applications based on the classified usage pattern.

Another example apparatus of any preceding apparatus includes wherein at least one of the one or more usage patterns includes a target minimum number of power state transitions of the type of hardware component from a higher-power state to a lower-power state of the one of the one or more electronic devices has performed over a time period.

Another example apparatus of any preceding apparatus includes wherein at least one of the one or more usage patterns includes a length of time the type of hardware component on the one of the one or more electronic devices is in a low-power state over a time period.

Another example apparatus of any preceding apparatus includes a usage pattern module configured to compare a number of power state transitions of the type of hardware component of the one of the one or more electronic devices has performed over the time period to activity information collected from others of the one or more electronic devices to output a power state deviation value for the one of the one or more electronic devices, and the timeout period selector further configured to adjust the timeout period if the power state deviation value for the one of the one or more electronic devices satisfies a deviation condition.

Another example apparatus of any preceding apparatus includes wherein the lower-power state is an intermediate power state, the type of hardware component consuming more power in the intermediate power state than in a lowest-power state.

An example apparatus includes one or more tangible processor-readable storage media embodied with instructions for executing on one or more processors and circuits of a device a process for power management electronic devices, the process including collecting activity information from one or more remote electronic devices regarding use of a type of hardware component on each of the one or more remote electronic devices by one or more applications executing on each of the one or more remote electronic devices, setting a timeout period associated with the use of the type of hardware component by the one or more applications based on the collected activity information, the timeout period defining a minimum amount of time before a power state of the type of hardware component is transitioned from a higher-power state to a lower-power state, and transmitting the timeout period to one of the one or more remote electronic devices executing the one or more applications to control power management on the one of the one or more remote electronic devices.

Another example apparatus of any preceding apparatus includes one or more tangible processor-readable storage media embodied with instructions for executing on one or more processors and circuits of a device a process for power management electronic devices, the process including determining one or more usage patterns in the one or more electronic devices executing the one or more applications based on the activity information, each usage pattern in the one or more usage patterns defining a usage pattern of the type of hardware component by the one or more applications, classifying the collected activity information of the one of the one or more electronic devices executing the one or more applications as satisfying at least one of the one or more usage patterns, and adjusting the timeout period associated with the use of the type of hardware component by the one or more applications based on the classified usage pattern.

Another example apparatus of any preceding apparatus includes one or more tangible processor-readable storage media embodied with instructions for executing on one or more processors and circuits of a device a process for power management electronic devices, the process including setting a wakeup period associated with use of the type of hardware component by the one or more applications based on the collected activity information, the wakeup period defining a maximum amount of time before a power status of the type of hardware component is transitioned from the lower-power state to a different power state, and transmitting the wakeup period to the one of the one or more remote electronic devices to control power management of the one of the one or more remote electronic devices.

Another example apparatus of any preceding apparatus includes one or more tangible processor-readable storage media embodied with instructions for executing on one or more processors and circuits of a device a process for power management electronic devices, the process including determining one or more usage patterns in the collected activity information, each usage pattern in the one or more usage patterns defining a usage pattern of the type of hardware component by the one or more applications, classifying the activity information of the one of the one or more electronic devices executing the one or more applications as one of the one or more usage patterns, and adjusting the wakeup period associated with use of the type of hardware component by the one or more applications based on the one of the one or more usage patterns.

Another example apparatus of any preceding apparatus includes one or more tangible processor-readable storage media embodied with instructions for executing on one or more processors and circuits of a device a process for power management electronic devices, the process including comparing the number of power state transitions of the type of hardware component of the one of the one or more electronic devices has performed over the time period to activity information collected from others of the one or more electronic devices to output a power state deviation value for the one of the one or more electronic devices, and adjusting the timeout period if the power state deviation value for the one of the one or more electronic devices satisfies a deviation condition.

Figure 10:
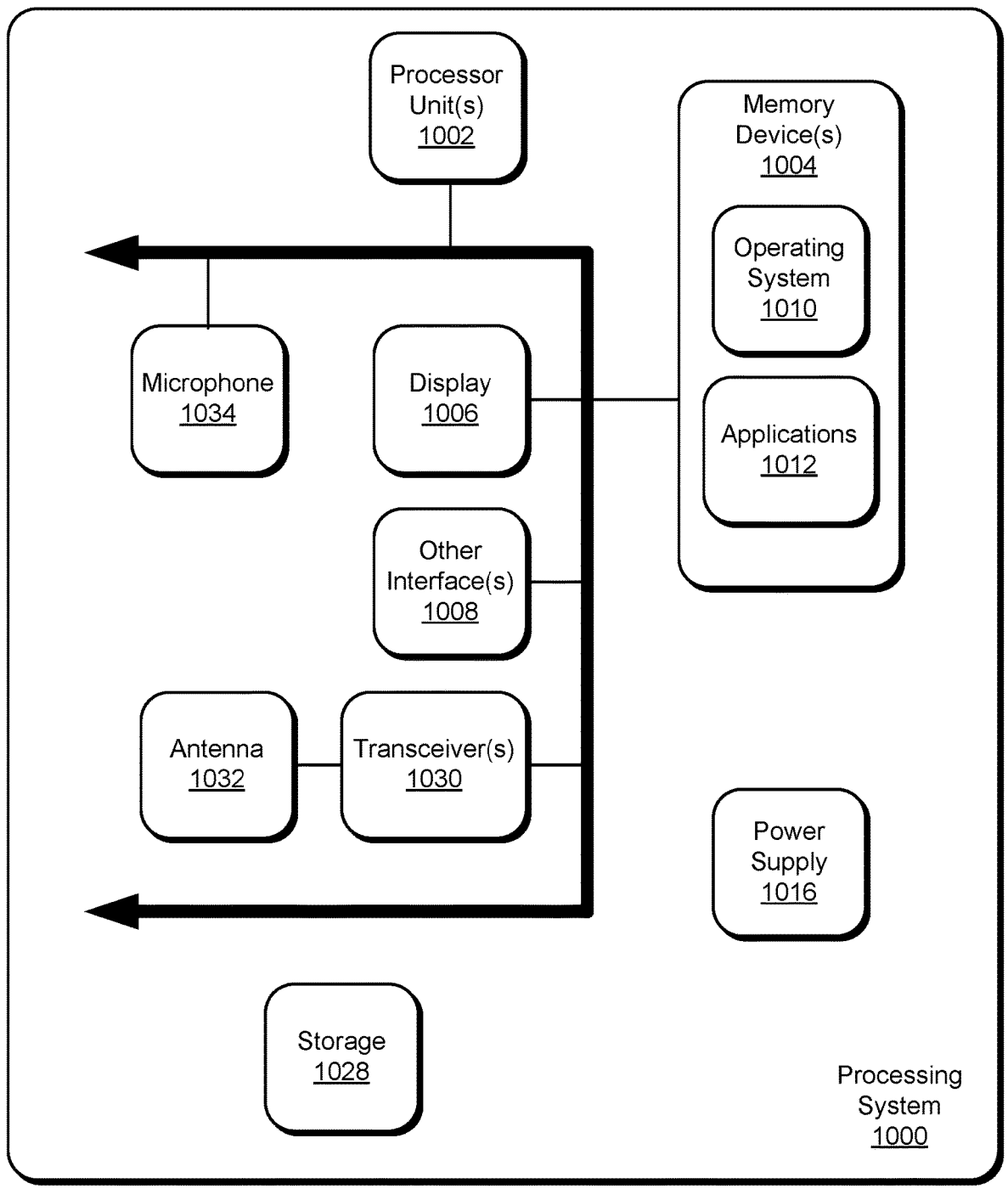
FIG. 10 illustrates an example processing system for use in aggregated power management of a remote computing device.

FIG. 10 illustrates an example processing system 1000 for use in aggregated power management of an electronic computing device. The processing system 1000 includes processors 1002 and memory 1004. On memory 1004 is stored the aggregated power management arbitrator and optionally other components of the aggregated power management system. The processing system may include one or more hardware devices, boxes, or racks, and may be hosted in a network data center.

According to various non-limiting examples, the computing systems described herein includes one or more devices, such as servers, storage devices, tablet computers, laptops, desktop computers, gaming consoles, media players, mobile phones, handheld computers, wearable devices, smart appliances, networking equipment, kiosk devices, and so forth. In one example configuration, the computing systems comprise at least one processor. The computing systems also contain communication connection(s) that allow communications with various other systems. The computing systems also include one or more input devices, such as a keyboard, mouse, pen, voice input device, touch input device, etc., and one or more output devices, such as a display (including a touch-screen display), speakers, printer, etc., coupled communicatively to the processor(s) and computer-readable media via connections such as a bus.

The memory 1004 is an example of computer-readable media. Computer-readable media stores computer-executable instructions that are loadable and executable by one or more processor(s), as well as data generated during execution of, and/or usable in conjunction with, these programs. In the illustrated example, computer-readable media stores OS instances, which provide basic system functionality to applications. One or more of these components, including the operating systems, may be instantiated as virtual machines, application containers, or as some other type of virtualized instantiation.

Processor(s) 1002 may include one or more single-core processing unit(s), multi-core processing unit(s), central processing units (CPUs), graphics processing units (GPUs), general-purpose graphics processing units (GPGPUs), or hardware logic components configured, e.g., via specialized programming from modules or application program interfaces (APIs), to perform functions described herein. In alternative examples one or more functions of the present disclosure may be performed or executed by, and without limitation, hardware logic components including Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processing unit(s) (DSPs), and other types of customized processing unit(s). For example, a processing unit configured to perform one or more of the functions described herein may represent a hybrid device that includes a CPU core embedded in an FPGA fabric. These or other hardware logic components may operate independently or, in some instances, may be driven by a CPU. In some examples, examples of the computing systems may include a plurality of processing units of multiple types. For example, the processing units may be a combination of one or more GPGPUs and one or more FPGAs. Different processing units may have different execution models, e.g., as is the case for graphics processing units (GPUs) and central processing units (CPUs).

Depending on the configuration and type of computing device used, computer-readable media (e.g., memory 1004) include volatile memory (such as random access memory (RAM)) and/or non-volatile memory (such as read-only memory (ROM), flash memory, 3D XPoint, resistive RAM, etc.). The computer-readable media can also include additional removable storage and/or non-removable storage including, but not limited to, SSD (e.g., flash memory), HDD (Hard Disk Drive) storage or other type of magnetic storage, optical storage, and/or other storage that can provide non-volatile storage of computer-executable instructions, data structures, program modules, and other data for computing systems.

Computer-readable media can, for example, represent computer memory, which is a form of computer storage media. Computer-readable media includes at least two types of computer-readable media, namely computer storage media and communications media. Computer storage media includes volatile and non-volatile, removable and non-removable media implemented in any process or technology for storage of information such as computer-executable instructions, data structures, programming modules, or other data. Computer storage media includes, but is not limited to, phase change memory (PRAM), Resistive RAM, 3D Xpoint non-volatile memory, static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other medium that can be used to store information for access and retrieval by a computing device. In contrast, communication media can embody computer-executable instructions, data structures, program modules, or other data in a modulated data signal, such as a carrier wave, or another transmission mechanism. As defined herein, computer storage media does not include communication media.

Various processes described herein are carried out as computing functions in conjunction with networking functions. For example, one computing device or system may cause transmission of a message to another computing device via network communication hardware. This may include, for example, passing by a software module a pointer, argument, or other data to a networking module. The pointer, argument or other data may identify data stored in memory or in a register that is to be transmitted to another computing device. The networking module may include a protocol stack and may read the data identified by the pointer, argument, or other data. The protocol stack may encapsulate the data in one or more frames, packets, cells, or other data networking protocol structures. The protocol stack (such as within the network power module or elsewhere) may call a network interface device driver, to cause physical transmission of electrical, magnetic, or optical signals along a communication medium to a network element, such as a gateway, router, switch, hub, and so forth. An underlying network may route or switch the data to the destination. The destination computing device may receive the data via a network interface card, which results in an interrupt being presented to a device driver or network adapter. A processor of the destination computing device passes the device driver an execution thread, which causes a protocol stack to de-encapsulate the data in the packets, frames, and cells in which the data was received. The protocol stack causes the received data to be stored in a memory, a register, or other location. The protocol stack may pass a pointer, argument, or other data that identifies where the received data is stored to a destination software module executing on the destination computing device. The software module receives an execution thread along with the argument, pointer, or other data, and reads the data from the identified location.

The processing system 1000 may also include a display 1006 (e.g., a touchscreen display, an OLED display with photodetectors, etc.), and other interfaces 1008 (e.g., a keyboard interface). The memory device 1004 generally includes both volatile memory (e.g., RAM) and non-volatile memory (e.g., flash memory). An OS 1010, such as one of the varieties of the Microsoft Windows® operating system, resides in the memory device 1004 and is executed by at least one of the processor units 1002, although it should be understood that other operating systems may be employed. Other features of the processing system 1000 may include without limitation an image sensor, a sensing trigger (e.g., a pressure sensor or a proximity sensor), etc.

One or more applications 1012, such as aggregated power management software, hardware power mode control software, etc., are loaded in the memory device 1004 and executed on the OS 1010 by at least one of the processor units 1002. The processing system 1000 includes a power supply 1016, which is powered by one or more batteries and/or other power sources and which provides power to other components of the processing system 1000. The power supply 1016 may also be connected to an external power source that overrides or recharges the built-in batteries or other power sources.

The processing system 1000 includes one or more communication transceivers 1030 to provide network connectivity (e.g., mobile phone network, Wi-Fi®, BlueTooth®, etc.). The processing system 1000 also includes various other components, such as a positioning system (e.g., a global positioning satellite transceiver), one or more audio interfaces 1034 (e.g., such a microphone, an audio amplifier and speaker and/or audio jack), one or more antennas 1032, and additional storage 1028. Other configurations may also be employed.

In an example implementation, a mobile operating system, various applications, modules for power management and device control (e.g., drivers, communication stack layers and/or sublayers), and other modules and services may be embodied by instructions stored in the memory device 1004 and/or storage devices 1028 and processed by the processing unit 1002. Timeout periods, wakeup periods, and other data may be stored in the memory device 1004 and/or storage devices 1028 as persistent datastores.

The processing system 1000 may include a variety of tangible processor-readable storage media and intangible processor-readable communication signals. Tangible processor-readable storage can be embodied by any available media that can be accessed by the processing system 1000 and includes both volatile and nonvolatile storage media, removable and non-removable storage media. Tangible processor-readable storage media excludes intangible communication signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing system 1000. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, OS software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a processor, cause the processor to perform methods and/or operations in accordance with the described implementations. The executable processor program instructions may include any suitable type of code, such as source code, compiled code, interpreted code, executable code, static code, dynamic code, and the like. The executable processor program instructions may be implemented according to a predefined processor language, manner or syntax, for instructing a processor to perform a certain operation segment. The instructions may be implemented using any suitable high-level, low-level, object-oriented, visual, compiled and/or interpreted programming language.

The implementations described herein are implemented as logical steps in one or more processor systems. The logical operations may be implemented (1) as a sequence of processor-implemented steps executing in one or more processor systems and (2) as interconnected machine or circuit modules within one or more processor systems. The implementation is a matter of choice, dependent on the performance requirements of the processor system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method for aggregated power management of electronic devices, the method comprising:
    collecting, at an aggregated power management arbitrator, activity information from one or more remote electronic devices regarding use of a type of hardware component on each of the one or more remote electronic devices by one or more applications executing on each of the one or more remote electronic devices, each of the one or more applications being registered to use the type of hardware component;
    setting, at the aggregated power management arbitrator, a timeout period associated with the use of the type of hardware component by the one or more registered applications based on the collected activity information, the timeout period defining a minimum amount of time before a power state of the type of hardware component is transitioned from a higher-power state to a lower-power state while at least one of the one or more applications remains registered to use the type of hardware component;
    determining one or more usage patterns in the one or more remote electronic devices executing the one or more applications based on the collected activity information, each usage pattern in the one or more usage patterns defining a usage pattern of the type of hardware component by the one or more applications;
    adjusting the timeout period associated with the type of hardware component by the one or more applications based on the one or more determined usage patterns; and
    transmitting, from the aggregated power management arbitrator, the adjusted timeout period to one of the one or more remote electronic devices executing the one or more registered applications to control power management on the one of the one or more remote electronic devices.

2. The method of claim 1, wherein the setting operation further comprises:
    classifying the collected activity information of the one of the one or more remote electronic devices executing the one or more applications as satisfying at least one of the one or more usage patterns; and
    adjusting the timeout period associated with the type of hardware component by the one or more applications based on the classified collected activity information.

3. The method of claim 1, wherein at least one of the one or more usage patterns is associated with a power savings condition.

4. The method of claim 3, wherein the adjusting operation includes reducing a length of the timeout period until the activity information indicates that the type of hardware component on the one of the one or more remote electronic devices satisfies the power savings condition.

5. The method of claim 3, wherein satisfying the power savings condition includes a target minimum number of transitions of the type of hardware component from the higher-power state to the lower-power state.

6. The method of claim 5, wherein the target minimum number of transitions is based on activity information collected from others of the one or more remote electronic devices.

7. The method of claim 1, further comprising:
setting a wakeup period associated with the use of the type of hardware component by the one or more applications based on the collected activity information, the wakeup period defining at least a maximum amount of time before a power status of the type of hardware component is transitioned from the lower-power state to a different power state; and
transmitting the wakeup period to the one of the one or more remote electronic devices to control power management of the one of the one or more remote electronic devices.

8. The method of claim 7, wherein the operation of setting a wakeup period further comprises:
determining one or more usage patterns in the collected activity information, each usage pattern in the one or more usage patterns defining a usage pattern of the type of hardware component by the one or more applications;
classifying the activity information of the one of the one or more remote electronic devices executing the one or more applications as one of the one or more usage patterns; and
adjusting the wakeup period associated with the use of the type of hardware component by the one or more applications based on the one of the one or more usage patterns.

9. The method of claim 8, wherein at least one of the one or more usage patterns includes an excessive idle condition of the type of hardware component on the one of the one or more remote electronic devices.

10. The method of claim 1, wherein the at least one of the one or more applications de-registers after expiration of the adjusted timeout period.

11. The method of claim 1, wherein the at least one of the one or more applications de-registers after the type of hardware component is transitioned from a higher-power state to a lower-power state.

12. The method of claim 1, wherein the adjusted timeout period is set to transition the type of hardware component from the higher-power state to the lower-power state after the at least one of the one or more applications has relinquished use of the type of hardware component while remaining registered to use the type of hardware component.

13. An aggregated power management control system comprising:
an activity information collector configured to collect activity information from one or more remote electronic devices regarding use of a type of hardware component on each of the one or more remote electronic devices by one or more applications executing on each of the one or more remote devices, each of the one or more applications being registered to use the type of hardware component;
a timeout period selector configured to select a timeout period associated with the use of the type of hardware component by the one or more registered applications based on the collected activity information, the timeout period defining a minimum amount of time before a power state of the type of hardware component is transitioned from a higher-power state to a lower-power state while at least one of the one or more applications remains registered to use the type of hardware component;
a usage pattern module configured to determine one or more usage patterns in the collected activity information of the one of the one or more remote electronic devices executing the one or more applications, each usage pattern in the one or more usage patterns defining a usage pattern of the type of hardware component by the one or more applications, wherein the timeout period selector adjusts the selected timeout period associated with the type of hardware component by the one or more applications based on the one or more determined usage patterns; and
a timeout period transmitter configured to transmit the adjusted timeout period to one of the one or more remote electronic devices, the one of the one or more remote electronic devices executing the one or more registered applications.

14. The aggregated power management control system of claim 13, further comprising:
a usage pattern classifier configured to classify the collected activity information of the one of the one or more remote electronic devices executing the one or more applications as satisfying at least one of the one or more usage patterns, the timeout period selector being further configured to adjust the timeout period associated with the use of the type of hardware component by the one or more applications based on the classified collected activity information.

15. The aggregated power management control system of claim 13, wherein at least one of the one or more usage patterns includes a target minimum number of power state transitions of the type of hardware component from a higher-power state to a lower-power state of the one of the one or more remote electronic devices has performed over a time period.

16. The aggregated power management control system of claim 15, further comprising:
a usage pattern module configured to compare a number of power state transitions of the type of hardware component of the one of the one or more remote electronic devices has performed over the time period to activity information collected from others of the one or more remote electronic devices to output a power state deviation value for the one of the one or more remote electronic devices, the timeout period selector being further configured to adjust the timeout period if the power state deviation value for the one of the one or more remote electronic devices satisfies a deviation condition.

17. The aggregated power management control system claim 13, wherein at least one of the one or more usage patterns includes a length of time the type of hardware component on the one of the one or more remote electronic devices is in a low-power state over a time period.

18. The aggregated power management control system of claim 13, wherein the lower-power state is an intermediate power state, the type of hardware component consuming more power in the intermediate power state than in a lowest-power state.

19. One or more tangible processor-readable storage media embodied with instructions for executing on one or more processors and circuits of a device a process for power management electronic devices, the process comprising:
registering one or more applications to use a type of hardware component on one or more remote electronic devices;
collecting activity information from the one or more remote electronic devices regarding use of the type of hardware component on each of the one or more remote electronic devices by the one or more registered applications executing on each of the one or more remote electronic devices, the activity information describing a usage history of the type of hardware component by the one or more registered applications;

setting a timeout period associated with the use of the type of hardware component by the one or more registered applications based on the collected activity information, the timeout period defining a minimum amount of time before a power state of the type of hardware component is transitioned from a higher-power state to a lower-power state while at least one of the one or more applications remains registered to use the type of hardware component;

determining one or more usage patterns in the one or more remote electronic devices executing the one or more applications based on the activity information, each usage pattern in the one or more usage patterns defining a usage pattern of the type of hardware component by the one or more applications;

adjusting the timeout period associated with the use of the type of hardware component by the one or more applications based on the one or more determined usage patterns; and transmitting the adjusted timeout period to one of the one or more remote electronic devices executing the one or more applications to control power management on the one of the one or more remote electronic devices.

20. The one or more tangible processor-readable storage media of claim 19, wherein the setting operation further comprises:

classifying the collected activity information of the one of the one or more remote electronic devices executing the one or more applications as satisfying at least one of the one or more usage patterns; and adjusting the timeout period associated with the use of the type of hardware component by the one or more applications based on the classified collected activity information.

21. The one or more tangible processor-readable storage media of claim 19, wherein the process further comprises:

setting a wakeup period associated with use of the type of hardware component by the one or more applications based on the collected activity information, the wakeup period defining a maximum amount of time before a power status of the type of hardware component is transitioned from the lower-power state to a different power state; and transmitting the wakeup period to the one of the one or more remote electronic devices to control power management of the one of the one or more remote electronic devices.

22. The one or more tangible processor-readable storage media of claim 21, wherein the process further comprises:

determining one or more usage patterns in the collected activity information, each usage pattern in the one or more usage patterns defining a usage pattern of the type of hardware component by the one or more applications;

classifying the activity information of the one of the one or more remote electronic devices executing the one or more applications as one of the one or more usage patterns; and adjusting the wakeup period associated with use of the type of hardware component by the one or more applications based on the one of the one or more usage patterns.

23. The one or more tangible processor-readable storage media of claim 19, wherein the activity information includes a number of power state transitions of the type of hardware component of the one of the one or more remote electronic devices has performed over a time period, and the process further comprises:

comparing the number of power state transitions of the type of hardware component of the one of the one or more remote electronic devices has performed over the time period to activity information collected from others of the one or more remote electronic devices to output a power state deviation value for the one of the one or more remote electronic devices; and adjusting the timeout period if the power state deviation value for the one of the one or more remote electronic devices satisfies a deviation condition.

* * * * *